United States Patent
Bao et al.

(10) Patent No.: US 12,330,067 B2
(45) Date of Patent: Jun. 17, 2025

(54) CLOUD GAMING PROCESSING METHOD, APPARATUS, AND DEVICE, AND STORAGE MEDIUM

(71) Applicant: Tencent Technology (Shenzhen) Company Limited, Shenzhen (CN)

(72) Inventors: Zenghui Bao, Shenzhen (CN); Zhipeng Gong, Shenzhen (CN); Bin Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 245 days.

(21) Appl. No.: 18/072,632

(22) Filed: Nov. 30, 2022

(65) Prior Publication Data

US 2023/0096900 A1    Mar. 30, 2023

Related U.S. Application Data

(63) Continuation of application No. PCT/CN2022/082147, filed on Mar. 22, 2022.

(30) Foreign Application Priority Data

Apr. 28, 2021  (CN) .................. 202110463379.X

(51) Int. Cl.
- *A63F 13/77* (2014.01)
- *A63F 13/52* (2014.01)
- *A63F 13/55* (2014.01)

(52) U.S. Cl.
CPC .............. *A63F 13/77* (2014.09); *A63F 13/52* (2014.09); *A63F 13/55* (2014.09); *A63F 2300/552* (2013.01); *A63F 2300/66* (2013.01)

(58) Field of Classification Search
CPC .................. A63F 13/5372; A63F 13/52; A63F 2300/306; A63F 2300/6653; A63F 13/77;
(Continued)

(56) References Cited

U.S. PATENT DOCUMENTS

| 4,894,774 A | * | 1/1990 | McCarthy | ............... G06T 15/10 463/2 |
| 5,742,289 A | * | 4/1998 | Naylor | .................... H04N 19/51 375/E7.176 |

(Continued)

FOREIGN PATENT DOCUMENTS

| CN | 110573221 A | 12/2019 |
| CN | 111773660 A | 10/2020 |

(Continued)

OTHER PUBLICATIONS

CN 112473133 A, machine translation, copyright 2024 Clarivate Analytics, downloaded from PE2E-Search on Sep. 20, 2024.*

(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

This application provides a cloud gaming processing method performed by a computer device, the method including: receiving an access request of a second client for a cloud gaming instance, the cloud gaming instance having been created according to a play request of a first client for a cloud gaming and shared by the first client with the second client, the first client being bound to a first stream processing resource of the cloud gaming instance, and data transmission between the cloud gaming instance and the first client being implemented by using the first stream processing resource; creating a second stream processing resource of the cloud (Continued)

gaming instance in response to the access request of the second client; binding the second stream processing resource to the second client; and implementing data transmission between the second client and the cloud gaming instance by using the second stream processing resource.

20 Claims, 14 Drawing Sheets

(58) Field of Classification Search
CPC ............... A63F 13/55; A63F 2300/552; A63F 2300/66; A63F 13/355; A63F 13/847; A63F 13/86; H04N 21/25825; H04N 21/25875; H04N 21/2662; H04N 21/214781; H04N 21/6582; H04N 21/6587
See application file for complete search history.

(56) References Cited

U.S. PATENT DOCUMENTS

| | | | | |
|---|---|---|---|---|
| 6,570,563 | B1* | 5/2003 | Honda | A63F 13/352 345/473 |
| 6,868,439 | B2* | 3/2005 | Basu | G06F 16/9574 709/216 |
| 6,985,528 | B2* | 1/2006 | Shin | H04N 19/63 375/E7.101 |
| 7,240,162 | B2* | 7/2007 | de Vries | H04N 21/8166 711/213 |
| 7,453,939 | B2* | 11/2008 | Pan | G06T 7/11 375/240.08 |
| 7,515,156 | B2* | 4/2009 | Tinker | G06T 15/10 345/475 |
| 7,796,095 | B2* | 9/2010 | Glen | G09G 5/395 345/3.1 |
| 8,554,526 | B2* | 10/2013 | Andersen | A63F 13/577 463/43 |
| 8,572,280 | B2* | 10/2013 | Dussault | A63F 13/355 348/700 |
| 8,632,407 | B2* | 1/2014 | Gelman | G07F 17/3223 463/40 |
| 8,698,813 | B2* | 4/2014 | Iwasaki | A63F 13/355 345/501 |
| 8,773,448 | B2* | 7/2014 | LaLonde | G06T 1/20 345/506 |
| 8,858,324 | B2* | 10/2014 | Kruglick | A63F 13/355 463/29 |
| 8,860,720 | B1* | 10/2014 | Kuo | H04N 21/8146 345/420 |
| 8,888,590 | B2* | 11/2014 | Kruglick | A63F 13/355 463/31 |
| 9,007,662 | B2* | 4/2015 | Hayakawa | H04N 1/00774 382/284 |
| 9,095,772 | B2* | 8/2015 | Kruglick | G06F 9/00 |
| 9,333,433 | B2* | 5/2016 | Cotter | H04L 69/04 |
| 9,480,914 | B2* | 11/2016 | Kruglick | G06T 15/20 |
| 9,498,715 | B2* | 11/2016 | Kruglick | A63F 13/50 |
| 9,987,562 | B2* | 6/2018 | Cotter | A63F 13/355 |
| 10,331,448 | B2* | 6/2019 | Son | G06F 9/30079 |
| 10,376,784 | B2* | 8/2019 | Chhaochharia | H04L 67/10 |
| 10,583,366 | B2* | 3/2020 | Cotter | H04L 69/04 |
| 10,926,177 | B2* | 2/2021 | Osman | A63F 13/577 |
| 11,014,010 | B2* | 5/2021 | Payzer | H04N 21/43076 |
| 11,623,153 | B2* | 4/2023 | Cotter | A63F 13/86 463/31 |
| 11,636,629 | B2* | 4/2023 | Joo | G06F 3/14 345/633 |
| 2003/0223501 | A1* | 12/2003 | Zhong | H04N 19/80 375/E7.193 |
| 2006/0052168 | A1* | 3/2006 | Shacham | A63F 13/30 463/42 |
| 2006/0058103 | A1 | 3/2006 | Danieli et al. | |
| 2006/0088220 | A1* | 4/2006 | Cheung | H04N 21/234336 382/232 |
| 2006/0160607 | A1* | 7/2006 | Okada | G07F 17/3255 463/20 |
| 2007/0217505 | A1* | 9/2007 | Lipka | H04N 19/61 375/E7.181 |
| 2008/0039208 | A1* | 2/2008 | Abrink | G07F 17/3232 707/999.001 |
| 2008/0098064 | A1* | 4/2008 | Sherinian | A63F 13/355 715/706 |
| 2008/0147971 | A1* | 6/2008 | Hawkins | A63F 13/00 711/E12.017 |
| 2009/0215540 | A1* | 8/2009 | Perlman | A63F 13/533 463/42 |
| 2009/0238405 | A1* | 9/2009 | Buznach | H04N 21/41407 382/103 |
| 2010/0060640 | A1* | 3/2010 | Melikian | G06T 15/20 345/427 |
| 2010/0161348 | A1* | 6/2010 | Lindell | G16H 40/20 707/E17.014 |
| 2010/0161384 | A1* | 6/2010 | Wells | G06Q 30/00 705/14.44 |
| 2010/0241692 | A1* | 9/2010 | Klee | A63F 13/30 709/203 |
| 2010/0265334 | A1* | 10/2010 | Bhaskaran | H04N 19/59 348/180 |
| 2010/0306813 | A1* | 12/2010 | Perry | H04L 65/80 725/114 |
| 2010/0322527 | A1* | 12/2010 | Fablet | G06T 9/00 382/232 |
| 2011/0053693 | A1* | 3/2011 | Wright | A63F 13/30 463/42 |
| 2011/0162005 | A1* | 6/2011 | Yerli | H04L 67/1097 725/114 |
| 2011/0300933 | A1* | 12/2011 | Chien | A63F 13/428 463/31 |
| 2011/0304634 | A1* | 12/2011 | Urbach | G06F 9/5016 709/217 |
| 2012/0053464 | A1* | 3/2012 | Murashita | A61B 8/483 600/443 |
| 2012/0270652 | A1* | 10/2012 | Kim | A63F 13/52 463/32 |
| 2013/0137518 | A1* | 5/2013 | Lucas | A63F 13/358 463/42 |
| 2013/0235035 | A1* | 9/2013 | Nara | H04N 19/17 345/428 |
| 2015/0217199 | A1* | 8/2015 | Cotter | H04L 67/131 463/31 |
| 2016/0243450 | A1* | 8/2016 | Cotter | A63F 13/352 |
| 2018/0264367 | A1* | 9/2018 | Cotter | H04L 69/04 |
| 2020/0197820 | A1* | 6/2020 | Cotter | H04L 69/04 |
| 2023/0241517 | A1* | 8/2023 | Cotter | H04L 69/04 463/31 |

FOREIGN PATENT DOCUMENTS

| | | |
|---|---|---|
| CN | 111818394 A | 10/2020 |
| CN | 112351302 A | 2/2021 |
| CN | 112473133 A | 3/2021 |
| CN | 112870711 A | 6/2021 |
| JP | 2005267347 A | 9/2005 |
| JP | 2012521268 A | 9/2012 |
| JP | 2015523886 A | 8/2015 |
| JP | 2020516346 A | 6/2020 |
| JP | 2020103741 A | 7/2020 |
| WO | WO 2010111100 A1 | 9/2010 |
| WO | WO 2014186858 A1 | 11/2014 |
| WO | WO 2020117442 A1 | 6/2020 |
| WO | WO 2020131530 A2 | 6/2020 |

OTHER PUBLICATIONS

Tencent Technology, Extended European Search Report, EP Patent Application No. 22794414.7, May 10, 2024, 7 pgs.
Tencent Technology, ISR, PCT/CN2022/082147, Jun. 22, 2022, 3 pgs.

(56) References Cited

OTHER PUBLICATIONS

Tencent Technology, WO, PCT/CN2022/082147, Jun. 22, 2022, 5 pgs.
Tencent Technology, IPRP, PCT/CN2022/082147, Oct. 24, 2023, 6 pgs.

* cited by examiner

CLOUD GAMING PROCESSING METHOD, APPARATUS, AND DEVICE, AND STORAGE MEDIUM

CROSS-REFERENCE TO RELATED APPLICATIONS

This application is a continuation application of PCT Patent Application No. PCT/CN2022/082147, entitled "A CLOUD GAME PROCESSING METHOD, DEVICE, DEVICE AND STORAGE MEDIUM" filed on Mar. 22, 2022, which claims priority to Chinese Patent Application No. 202110463379.X, filed with the State Intellectual Property Office of the People's Republic of China on Apr. 28, 2021, and entitled "CLOUD GAMING PROCESSING METHOD, APPARATUS, AND DEVICE, AND STORAGE MEDIUM", all of which are incorporated herein by reference in their entirety.

FIELD OF THE TECHNOLOGY

This application relates to the field of computer technologies, and in particular, to the field of cloud gaming technologies, and specifically, to processing of cloud gaming.

BACKGROUND OF THE DISCLOSURE

With rapid development of computer technologies, cloud gaming plays an increasingly important role in the game market. Cloud gaming refers to a game manner based on cloud computing. A general process of cloud gaming is as follows: A user requests to start cloud gaming by using a terminal, and the cloud gaming starts a cloud gaming instance in the cloud. The user logs in to the cloud gaming instance through the terminal to operate the cloud gaming instance, that is, implements playing of the cloud gaming. In an operating mode of the cloud gaming, all cloud gaming instances run on a cloud gaming server, and the cloud gaming server compresses a game picture obtained by rendering and then transmits the picture to the terminal of the user for presentation by using a network. When the terminal detects an operation event of the user, such as a touchscreen event or a keyboard mouse event, the terminal transmits the operation event to the cloud gaming server by using the network, so as to implement an operation on the cloud gaming.

SUMMARY

Embodiments of this application provide a cloud gaming processing method, apparatus, and device, and a storage medium, so as to improve flexibility and diversity of a cloud gaming operation mode.

According to one aspect, an embodiment of this application provides a cloud gaming processing method, and the cloud gaming processing method includes:

receiving an access request of a second client for a cloud gaming instance, the cloud gaming instance having been created according to a play request of a first client for a cloud gaming and shared by the first client with the second client, the first client being bound to a first stream processing resource of the cloud gaming instance, and data transmission between the cloud gaming instance and the first client being implemented by using the first stream processing resource;

creating a second stream processing resource of the cloud gaming instance in response to the access request of the second client;

binding the second stream processing resource to the second client; and implementing data transmission between the second client and the cloud gaming instance by using the second stream processing resource.

According to another aspect, an embodiment of this application provides a cloud gaming processing apparatus, where the cloud gaming processing apparatus includes a media coding module and a media transmission module, where:

the media transmission module is configured to receive an access request of a second client for a cloud gaming instance, the cloud gaming instance having been created according to a play request of a first client for a cloud gaming and shared by the first client with the second client, the first client being bound to a first stream processing resource of the cloud gaming instance, and data transmission between the cloud gaming instance and the first client being implemented by using the first stream processing resource;

both the media coding module and the media transmission module are configured to create a second stream processing resource of the cloud gaming instance in response to the access request of the second client; and the media transmission module is further configured to bind the second stream processing resource to the second client; and implement data transmission between the second client and the cloud gaming instance by using the second stream processing resource.

According to another aspect, an embodiment of this application provides a cloud gaming processing device, where the cloud gaming processing device includes:

a processor, adapted to implement a computer program; and a computer-readable storage medium, storing a computer program, the computer program being loaded and executed by a processor to implement the foregoing cloud gaming processing method.

According to another aspect, an embodiment of this application provides a computer-readable storage medium, storing a computer program, the computer program being read and executed by a processor of the computer device to cause the computer device to implement the foregoing cloud gaming processing method.

According to another aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing cloud gaming processing method.

In the embodiments of this application, when a first client initiates a play request for cloud gaming and creates a cloud gaming instance, a first stream processing resource of the cloud gaming instance is allocated to the first client, and the first client is bound to the first stream processing resource. Data transmission between the cloud gaming instance and the first client is implemented by using the first stream processing resource. A second client may request to access the cloud gaming instance created by the first client. In response to the access request of the second client, a second stream processing resource of the cloud gaming instance is allocated to the second client, and the second stream processing resource is bound to the second client. Data transmission between the second client and the cloud gaming instance may be implemented by using the second stream processing resource. It can be learned that the embodiments of this application support a plurality of operations on the same cloud gaming instance, that is, allow a plurality of clients (for example, the first client and the second client) to access and operate the same cloud gaming instance, thereby effectively improving flexibility and diversity of a cloud gaming operation mode. In addition, each client connected to the same cloud gaming instance is bound to a separate stream processing resource of the cloud gaming instance, and implements data transmission by using the separate stream processing resource bound to the client. In this way, targeted and independent coding traffic control and quality control can be performed on each client based on each stream processing resource, and because stream processing resources are independent of each other and do not affect each other, data transmission can be performed efficiently and stably between the client and the cloud gaming instance.

DESCRIPTION OF EMBODIMENTS

Figure 1:
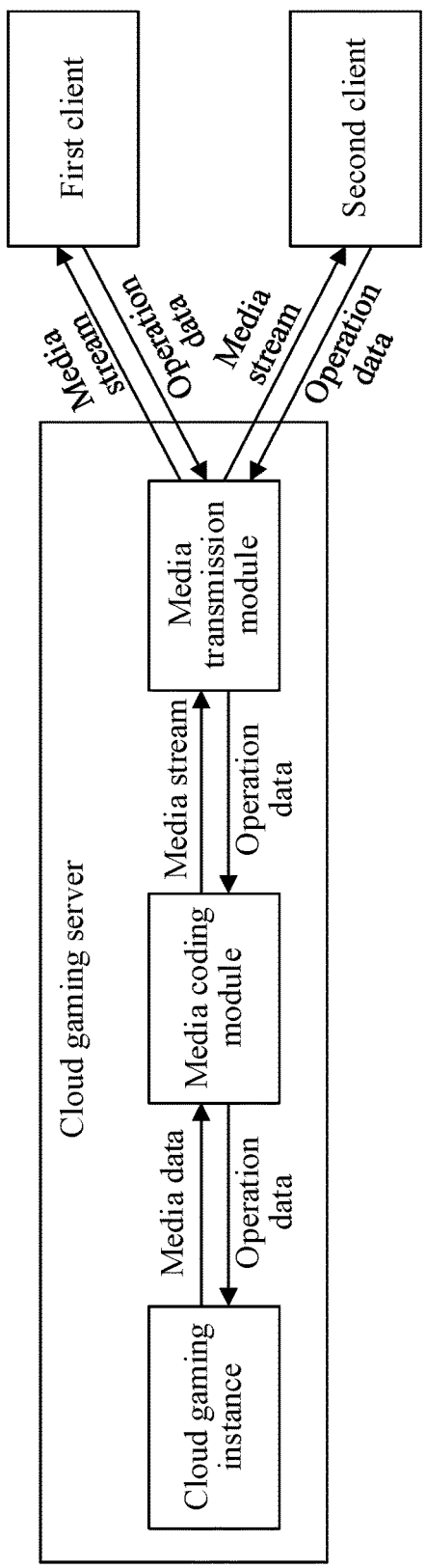
FIG. 1 is a schematic diagram of a cloud gaming processing solution according to an exemplary embodiment of this application.

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

To better understand the technical solutions provided in the embodiments of this application, the following describes the technical terms involved in the embodiments of this application.

(1) Cloud gaming. Cloud gaming may also be referred to as gaming on demand, and is a game manner based on a cloud computing technology. Cloud gaming enables a thin client with relatively limited graphics processing and data computing capabilities to run high-quality games. In a cloud gaming scenario, all cloud gaming instances do not run in a terminal used by a user, but run in a cloud gaming server. The cloud gaming server compresses and codes a game picture and game audio in the cloud gaming instance into a media stream, and then transmits, by using a network, the media stream to the terminal used by the user. The media stream may include a video stream and an audio stream. The terminal used by the user does not need to have a powerful graphics processing and data computing capability, and only needs to have a basic streaming media playback capability, and a capability of obtaining an operation instruction entered by the user and transmitting the operation instruction entered by the user to the server.

(2) Cloud gaming instance. Cloud gaming is deployed and runs on a cloud gaming instance, where the cloud gaming instance represents a virtual computing resource, and the virtual computer resource may include: a set of basic computing components such as a central processing unit (CPU), an operating system, a network, a disk, and a graphics processing unit (GPU). That is, the cloud gaming instance is cloud gaming that is successfully started and can be actually operated. In a feasible implementation, the cloud gaming instance may use the OpenGL for embedded systems (OpenGL ES) technology to render a game interface. OpenGL ES is a subset of an Open Graphics Library (OpenGL) three-dimensional graphics application programming interface (API). The OpenGL ES may include an API for graphics rendering.

(3) Docker. The docker is a lightweight virtualization solution in cloud gaming, and a cloud gaming instance runs in the docker. The cloud gaming server may run a plurality of dockers, and each docker corresponds to one cloud gaming instance. In the embodiments of this application, the docker may include a docker in an ARM server or a Linux environment. The docker is an open source application docker engine that allows developers to package their applications and dependency packages to a portable image, and then publish the image to any popular Linux (an operating system) or Windows (an operating system) machine to implement virtualization. An advanced RISC machine (ARM) server is a reduced instruction set computing (RISC) microprocessor, and is characterized by a small size, low power consumption, low costs, and high performance.

(4) Cloud computing. Cloud gaming is based on cloud computing technologies, which provide powerful graphics processing and data computing capabilities for cloud gaming. cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid as use. As a basic capability provider of cloud computing, a cloud computing resource pool (cloud platform for short) is established, which is generally referred to as an infrastructure as a service (IaaS) platform, and a plurality of types of virtual resources are deployed in the cloud computing resource pool for external customers to choose from. The cloud computing resource pool mainly includes: a computing device (a virtualized machine, including an operating system), a storage device, and a network device. According to logical functions, a platform as a service (PaaS) layer may be deployed on the IaaS layer, and the software as a service (SaaS) layer may be deployed on the PaaS layer, or the SaaS may be directly deployed on the IaaS layer. PaaS is a platform for software (e.g., a database or a web docker) to run. SaaS is a variety of service software (e.g., a web portal or a short message group transmitter). Generally, SaaS and PaaS are upper layers relative to IaaS.

Cloud computing may refer to a mode of delivery and use of an Internet Technology (IT) infrastructure, and may refer to obtaining a required resource in an on-demand and easy-to-scale manner by using a network. Generalized cloud computing refers to a mode of service delivery and use, and a required service is obtained through a network in an on-demand and easy-to-scale manner. This service may be related to IT, software, the Internet, or other services. Cloud computing is a product of development and convergence of conventional computers and network technologies such as grid computing, distributed computing, parallel computing, utility computing, network storage, virtualization, load balancing, and the like. With the development of the Internet, real-time data streams, and connection devices, and the development of demands for search services, social networks, mobile commerce, and open collaboration, cloud computing rapidly develops. Unlike the previous parallel distributed computing, cloud computing can revolutionize the entire Internet mode and enterprise management mode.

(5) Blockchain technology. A blockchain is a new application mode of computer technologies such as distributed data storage, peer-to-peer transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain ensures, in a cryptographic manner, that data cannot be tampered with or forged.

To better understand the technical solutions provided in the embodiments of this application, the following describes implementation principles of cloud gaming. An implementation principle of cloud gaming includes: (1) A terminal (for example, a mobile phone or a personal computer (PC)) may include a client of cloud gaming, and a user may enter cloud gaming by using the client of the cloud gaming to play. (2) A cloud gaming server allocates and runs a docker for each client participating in the cloud gaming. Running a docker means starting a cloud gaming instance, that is, the user plays the cloud gaming once, which is corresponding to one cloud gaming instance. For example, the user enters the cloud gaming by using a client of the cloud gaming, and plays it. In this case, the cloud gaming server starts and runs a docker on the cloud, that is, starts and runs a cloud gaming instance. The cloud gaming instance is corresponding to the client used by the user, and the cloud gaming instance provides a game interface of the cloud gaming for the client of the cloud gaming. (3) The client of the cloud gaming displays the game interface returned by the cloud gaming instance corresponding to the client of the cloud gaming. When the user performs various operations on the game interface, the client of the cloud gaming reports operation data generated by these operations to the cloud gaming server. The cloud gaming server refreshes the game interface of the cloud gaming according to the operation data in the corresponding cloud gaming instance, and returns the refreshed game interface to the client of the cloud gaming for display. (4) When the cloud gaming is finished, the cloud gaming instance created in the cloud gaming server is destroyed automatically. The operation performed by the user on the game interface may include a move operation, a select operation, and the like. For example, the user moves a game role in the game interface from a first position in the game interface to a second position in the game interface. For another example, the user selects a game control in the game interface (such as tapping, double tapping, and long pressing). The operation data generated by the operation may include operation touchscreen coordinates. For example, the user moves the game role in the game interface from the first position in the game interface to the second position in the game interface, and in this case, the operation data may include coordinates of the first position in the game interface and coordinates of the second position in the game interface. For another example, if the user selects a game control in the game interface, in this case, the operation data may include coordinates of the game control in the game interface.

Currently, in a cloud gaming use scenario, a user is generally allowed to operate only a cloud gaming instance to which the user is registered, which causes inflexibility and diversity of a cloud gaming operation mode. To improve flexibility and diversity of an operation mode of cloud gaming, some practices are implemented in the embodiments of this application, and a series of solutions that support a plurality of operations on the same cloud gaming instance in the cloud gaming are proposed.

For one solution, refer to FIG. 1. FIG. 1 is a schematic diagram of a cloud gaming processing solution according to an exemplary embodiment of this application. As shown in FIG. 1, a plurality of (two or more) clients may access to the same cloud gaming instance of cloud gaming. In this embodiment of this application, for example, a first client and a second client gain access. The first client and the second client share the same stream processing resource, and the cloud gaming instance performs data transmission with the first client or the second client based on the shared stream processing resource. Herein, the stream processing resource is a tool (for example, a hardware or software program) that processes various types of data such as media streams and operation data involved in a play process of the cloud gaming. The stream processing resource may include a codec resource, a transmission control resource, and the like. The codec resource may be used for performing encoding processing or decoding processing, and the transmission control resource may be used for performing data transmission, transmission control, and the like. The codec resource may be provided by a media coding module, and the transmission control resource may be provided by a media transmission module. A data transmission process based on the shared stream processing resource between the cloud gaming instance and the first client or the second client may include: A cloud gaming server transmits a media stream in the cloud gaming instance to the first client and the second client based on the stream processing resource; when the first client requests to operate the cloud gaming instance, the cloud gaming server receives operation data of the first client based on the stream processing resource; and when the second client requests to operate the cloud gaming instance, the cloud gaming server receives operation data of the second client based on the stream processing resource.

As shown in FIG. 1, the shared stream processing resource may be provided by the media coding module and the media transmission module. The media coding module provides one channel of codec resource, and the media transmission module provides one channel of transmission control resource. The first client and the second client share the same stream processing resource, that is, the first client and the second client share the same channel of codec resource and the same channel of transmission control resource. The media coding module may be configured to collect media data in the cloud gaming instance, and the media data may include a game picture and game audio. After the media data in the cloud gaming instance is collected, the media coding module may perform coding processing on the collected media data to obtain a media stream, where the media stream may include a video stream and an audio stream. The media transmission module may then be configured to forward the media stream to the first client and the second client. When the first client operates the cloud gaming instance, the media transmission module may transmit the operation data of the first client to the media coding module, and the media coding module injects the operation data of the first client into the cloud gaming instance, so as to implement an operation on the cloud gaming instance. When the second client operates the cloud gaming instance, the media transmission module may transmit the operation data of the second client to the media coding module, and the media coding module injects the operation data of the second client into the cloud gaming instance, so as to implement an operation on the cloud gaming instance. The solution shown in FIG. 1 may support a plurality of clients accessing the same cloud gaming instance of the cloud gaming, and support a plurality of operations on the same cloud gaming instance, thereby improving flexibility and diversity of a cloud gaming operation mode to a certain extent. However, through practice, it is found that when a plurality of clients that access a cloud gaming instance share the same stream processing resource, the stream processing resource is shared by the plurality of clients. In a peak network traffic period, the plurality of clients easily preempt the resource among each other, resulting in a delay in a transmission process of a media stream and a low definition of the media stream.

Figure 2:
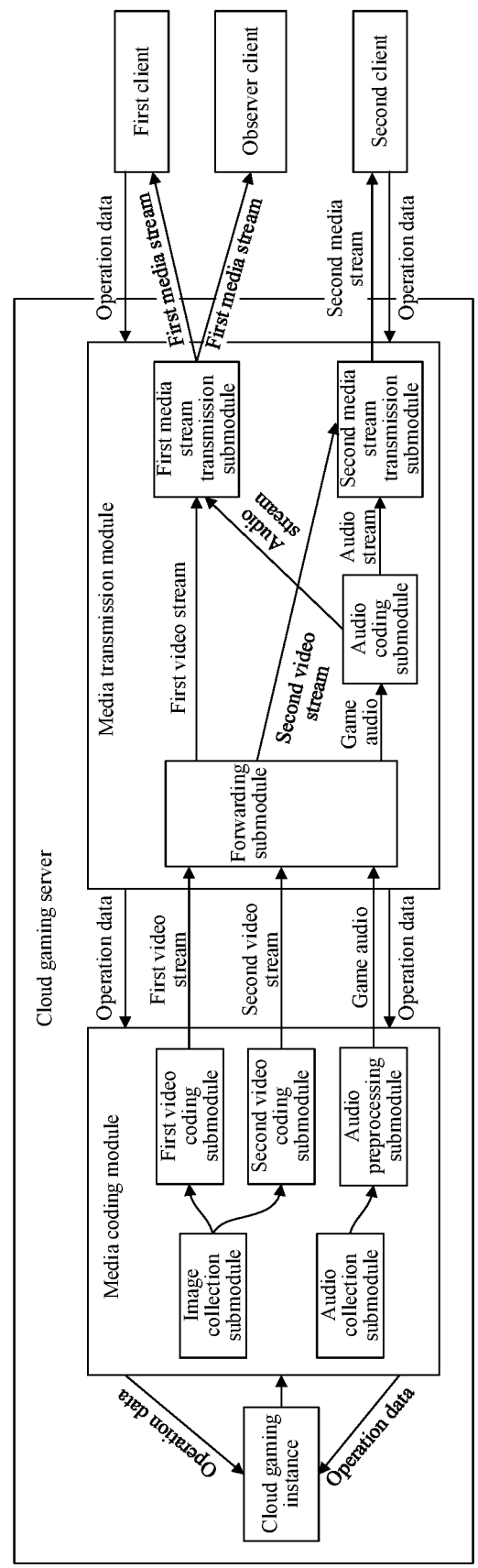
FIG. 2 is a schematic diagram of a cloud gaming processing solution according to another exemplary embodiment of this application.

Based on the solution shown in FIG. 1, an embodiment of this application further proposes another solution. For another solution, refer to FIG. 2. FIG. 2 is a schematic diagram of a cloud gaming processing solution according to another exemplary embodiment of this application. As shown in FIG. 2, cloud gaming can also support a plurality of (two or more) clients accessing the same cloud gaming instance of cloud gaming, and support a plurality of operations on the same cloud gaming instance. For example, in this embodiment of this application, a first client and a second client gain access. In addition, each client accessing the same cloud gaming instance is bound to a separate stream processing resource of the cloud gaming instance, and performs data transmission based on the separate stream processing resource bound to the client.

For the first client, the first client accessing the cloud gaming instance is bound to a first stream processing resource, and may perform data transmission between the cloud gaming instance and the first client based on the first stream processing resource bound to the first client. The first stream processing resource may include a separate codec resource and a separate transmission control resource. The codec resource in the first stream processing resource may be provided by a first video coding submodule, and the transmission control resource in the first stream processing resource may be provided by a first media stream transmission submodule. A data transmission process based on the first stream processing resource between the cloud gaming instance and the first client may include: The first video coding submodule may be configured to perform coding processing on a game picture collected from the cloud gaming instance, and transmit a first video stream obtained through coding to the first media stream transmission submodule. The first media stream transmission submodule may transmit a first media stream including the first video stream and an audio stream to the first client. When the first client operates the cloud gaming instance, the first media stream transmission submodule may transmit operation data of the first client to the first video coding submodule, and the first video coding submodule injects the operation data of the first client into the cloud gaming instance.

For the second client, the second client accessing the cloud gaming instance is bound to a second stream processing resource, and may perform data transmission between the cloud gaming instance and the second client based on the second stream processing resource bound to the second client. The second stream processing resource may include a separate codec resource and a separate transmission control resource. The codec resource of the second stream processing resource may be provided by a second video coding submodule, and the transmission control resource of the second stream processing resource may be provided by a second media stream transmission submodule. A data transmission process based on the second stream processing resource between the cloud gaming instance and the second client may include: The second video coding submodule may be configured to perform coding processing on a game picture collected from the cloud gaming instance, and transmit a second video stream obtained through coding to the second media stream transmission submodule. The second media stream transmission submodule may transmit a second media stream including the second video stream and an audio stream to the second client. When the second client operates the cloud gaming instance, the second media stream transmission submodule may transmit operation data of the second client to the second video coding submodule, and the second video coding submodule injects the operation data of the second client into the cloud gaming instance. In this solution, based on stream processing resources independent of each other, it is advantageous to separately perform targeted and independent coding traffic control and quality control on each client, and because stream processing resources are independent of each other and do not affect each other, data transmission can be performed efficiently and stably between the client and the cloud gaming instance.

Figure 3:
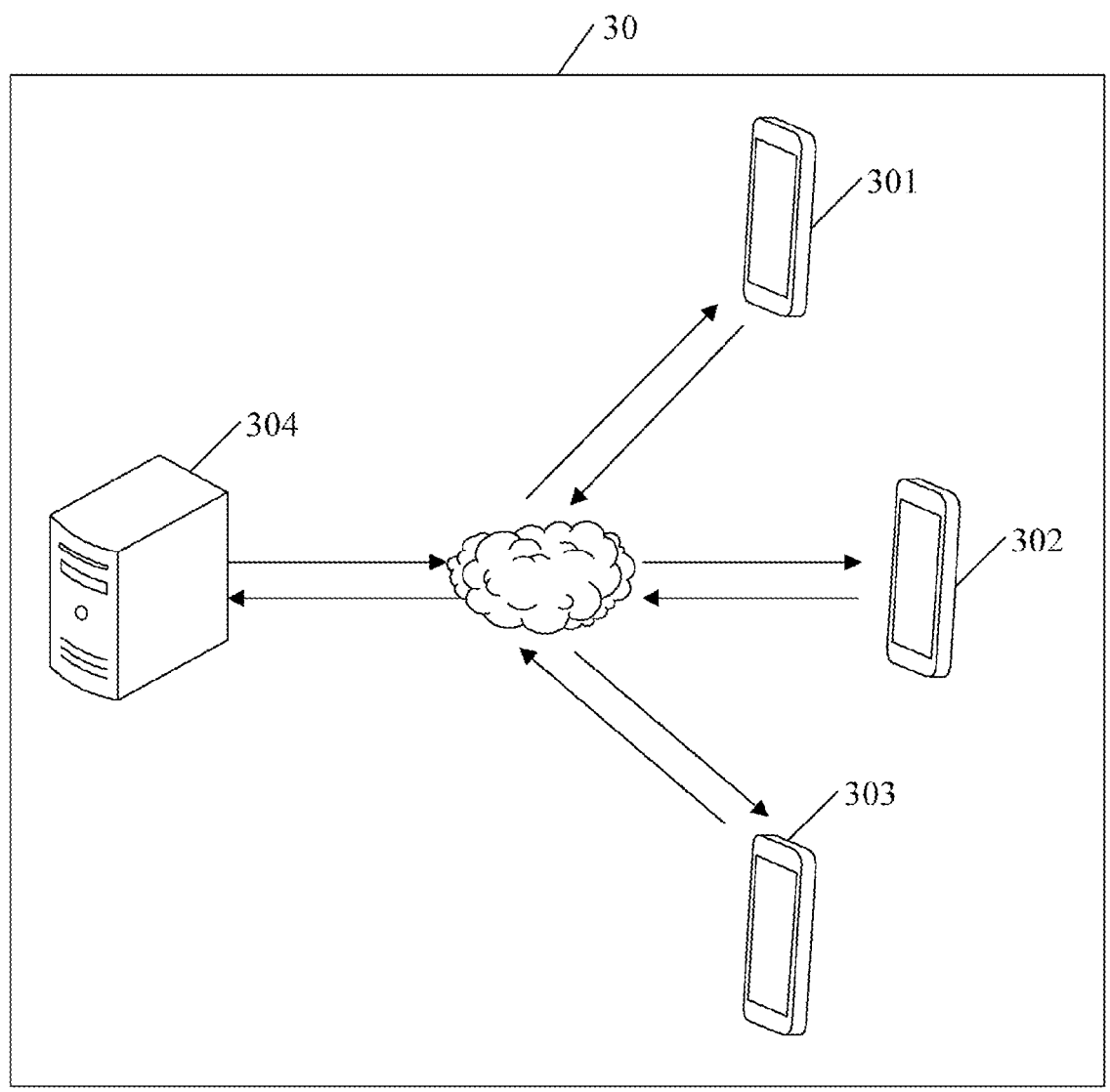
FIG. 3 is a schematic architecture diagram of a cloud gaming processing system according to an exemplary embodiment of this application.

The following describes a cloud gaming processing system suitable for implementing the cloud gaming processing solution provided in the embodiments of this application, and describes in more detail the cloud gaming processing solution shown in FIG. 2 with reference to the cloud gaming processing system. FIG. 3 is a schematic architecture diagram of a cloud gaming processing system according to an exemplary embodiment of this application. As shown in FIG. 3, a cloud gaming processing system 30 may include a first terminal 301, a second terminal 302, a third terminal 303, and a server 304. In an actual application scenario, there may be at least one terminal included in the cloud gaming processing system 30. In this embodiment of this application, that the cloud gaming processing system 30 includes the first terminal 301, the second terminal 302, and the third terminal 303 is used as an example for description. The first terminal 301, the second terminal 302 or the third terminal 303 may be a smartphone, a tablet computer, a notebook computer, a desktop computer, an on-vehicle device, a smart speaker, a smartwatch, or the like, but are not limited thereto. A first client of the cloud gaming can run in the first terminal 301. The second terminal 302 may run a second client that has cloud gaming, and the third terminal 303 may run an observer client. The first client, the second client, and the observer client may be any one of the following: an independent application program, an API, or a software development kit (SDK). The server 304 of the cloud gaming may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data and an artificial intelligence platform. The first terminal 301, the second terminal 302, the third terminal 303, and the server 304 of the cloud gaming may be directly or indirectly connected in a wired or wireless communication manner. This is not limited in this application.

The server 304 may include a cloud gaming instance, a media coding module, and a media transmission module.

The media coding module may include an image collection submodule, an audio collection submodule, an audio preprocessing submodule, and at least one video coding submodule. In this embodiment of this application, an example in which the media coding module includes a first video coding submodule and a second video coding submodule is used for description. The image collection submodule may be configured to collect a game picture in a cloud gaming instance. The audio collection submodule may be configured to collect a game audio in the cloud gaming instance. The first video coding submodule may be configured to perform coding processing on the collected game picture, and transmit a first video stream obtained through coding to the media transmission module. The second video coding submodule may be configured to perform coding processing on the collected game picture, and transmit a second video stream obtained through coding to the media transmission module. The audio preprocessing submodule may be configured to: perform audio preprocessing on the collected game audio, and transmit a game audio obtained after the audio preprocessing to the media transmission module. The audio preprocessing refers to simple processing performed on the game audio before coding. The audio preprocessing may improve coding efficiency of the game audio. The audio preprocessing may include performing noise reduction processing on the game audio, extracting an audio feature of the game audio, and the like.

The media transmission module may include an audio coding submodule, a forwarding submodule, and at least one media stream transmission submodule. In this embodiment of this application, an example in which the media transmission module includes a first media stream transmission submodule and a second media stream transmission submodule is used for description. The forwarding submodule may be configured to perform data forwarding. For example, the forwarding submodule may be configured to forward the first video stream transmitted by the first video coding submodule to the first media stream transmission submodule, the forwarding submodule may be further configured to forward the second video stream transmitted by the second video coding submodule to the second media stream transmission submodule, and the forwarding submodule may be further configured to forward the pre-processed game audio transmitted by the audio preprocessing submodule to the audio coding submodule. The audio coding submodule may be configured to perform coding processing on the game audio obtained after the audio preprocessing, to obtain an audio stream, and forward the audio stream to the first media stream transmission submodule and the second media stream transmission submodule. The first media stream transmission submodule may be configured to transmit a first media stream composed of the first video stream and the audio stream to the first client and the observer client. The second media stream transmission submodule may be configured to transmit a second media stream composed of the second video stream and the audio stream to the second client.

Based on the cloud gaming processing solution shown in FIG. 2 and the cloud gaming processing system shown in FIG. 3, functions such as data transmission, traffic control, permission control, real-time transmission parameter adjustment, and transmission monitoring may be implemented between the cloud gaming instance and the client. The following separately describes the foregoing functions:

(1) Data Transmission.

The first video coding submodule may provide a coding and decoding resource of the first stream processing resource, and the first media stream transmission submodule may provide a transmission control resource of the first stream processing resource. That is, the first video coding submodule and the first media stream transmission submodule jointly provide the first stream processing resource. The first stream processing resource is bound to the first client, and data transmission may be performed between the cloud gaming instance and the first client based on the first stream processing resource. A data transmission process based on the first stream processing resource between the cloud gaming instance and the first client may include: The first video coding submodule may perform coding processing on a game picture collected from the cloud gaming instance, and transmit a first video stream obtained through coding to the first media stream transmission submodule. The first media stream transmission submodule may transmit a first media stream including the first video stream and an audio stream to the first client. When the first client operates the cloud gaming instance, the first media stream transmission submodule may transmit operation data of the first client to the first video coding submodule, and the first video coding submodule injects the operation data of the first client into the cloud gaming instance. In this manner, binding the first client to the first stream processing resource can ensure efficient and stable data transmission between the first client and the cloud gaming instance.

The second video coding submodule may provide a coding and decoding resource of the second stream processing resource, and the second media stream transmission submodule may provide a transmission control resource of the second stream processing resource. That is, the second video coding submodule and the second media stream transmission submodule jointly provide the second stream processing resource. The second stream processing resource is bound to the second client, and data transmission may be performed between the cloud gaming instance and the second client based on the second stream processing resource. A data transmission process based on the second stream processing resource between the cloud gaming instance and the second client may include: The second video coding submodule may perform coding processing on the collected game picture, and transmit the coded second video stream to the second media stream transmission submodule. The second media stream transmission submodule may transmit a second media stream including the second video stream and an audio stream to the second client. When the second client operates the cloud gaming instance, the second media stream transmission submodule may transmit operation data of the second client to the second video coding submodule, and the second video coding submodule injects the operation data of the second client into the cloud gaming instance. In this manner, binding the second client to the second stream processing resource can ensure efficient and stable data transmission between the second client and the cloud gaming instance.

(2) Traffic Control

The first stream processing resource may perform traffic control in a process of transmitting the first media stream. A specific process of traffic control is as follows: In a process of transmitting the first media stream to the first client, the first media stream transmission submodule may further transmit a network probe packet to the first client, and receive network information returned by the first client. The network probe packet refers to a probe tool package that can be used for detecting a network congestion situation. The network information refers to network congestion information. When the network information indicates that no network congestion occurs, the first media stream transmission submodule may transmit a first traffic control instruction to the first video coding submodule. The first traffic control instruction may be used for instructing the first video coding submodule to increase a media code rate in the first video coding submodule, increase a frame rate of a media frame in the first video coding submodule, and the like. When the network information indicates that network congestion has occurred, the first media stream transmission submodule may transmit a second traffic control instruction to the first video coding submodule. The second traffic control instruction may be used for instructing the first video coding submodule to reduce a media code rate in the first video coding submodule, reduce a frame rate of a media frame in the first video coding submodule, discard some media frames in the first media stream, and the like. The media code rate may be a quantity of bits of a media stream transmitted within a unit time (for example, 1 second). The higher the media code rate, the clearer picture quality of the game picture. The lower the media code rate, the less clear the picture quality of the game picture. The frame rate of the media frame may be a quantity of media frames in an encoded media stream within a unit time (for example, 1 second). The higher the frame rate of the media frame, the smoother the game picture. The lower the frame rate of the media frame, the more freezing the game picture. In this manner, traffic control may be performed on the first client in a specific and independent manner, thereby effectively reducing a delay generated in the process of transmitting the media stream to the first client, and improving definition and fluency of the media stream.

The second stream processing resource may perform traffic control in a process of transmitting the second media stream. A specific process of traffic control is as follows: In a process of transmitting the second media stream to the second client, the second media stream transmission submodule may further transmit a network probe packet to the second client, and receive network information returned by the second client. When the network information indicates that no network congestion occurs, the second media stream transmission submodule may transmit a first traffic control instruction to the second video coding submodule. The first traffic control instruction may be used for instructing the second video coding submodule to increase a media code rate in the second video coding submodule, increase a frame rate of a media frame in the second video coding submodule, and the like. When the network information indicates that network congestion has occurred, the second media stream transmission submodule may transmit a second traffic control instruction to the second video coding submodule. The second traffic control instruction may be used for instructing the second video coding submodule to reduce a media code rate in the second video coding submodule, reduce a frame rate of a media frame in the second video coding submodule, discard some media frames in the second media stream, and the like. In this manner, traffic control may be performed on the second client in a specific and independent manner, thereby effectively reducing a delay generated in the process of transmitting the media stream to the second client, and improving definition and fluency of the media stream.

(3) Permission Control

In the first client and the second client that access the cloud gaming instance, operation data of a client that has an operation permission for the cloud gaming instance may be injected into the cloud gaming instance, and operation data of a client that does not have an operation permission for the cloud gaming instance is discarded in a transmission process. Specifically, if the first client does not have the operation permission for the cloud gaming instance, the first video coding submodule may discard the operation data of the first client. Alternatively, if the second client does not have the operation permission for the cloud gaming instance, the second video coding submodule may discard the operation data of the second client. In this manner, permission control may be performed on each client that accesses the cloud gaming instance by discarding operation data, which facilitates permission control on each client that accesses the cloud gaming instance.

(4) Real-Time Transmission Parameter Adjustment

The cloud gaming instance can support real-time transmission parameter adjustment. A client that accesses the cloud gaming instance may transmit a transmission parameter setting request to the media transmission module. The media transmission module responds to the transmission parameter setting request, and may correct an original transmission parameter. The media coding module may encode and process a game picture by using the corrected transmission parameter. For example, if the first client that accesses the cloud gaming instance transmits a media code rate setting request to the first media stream transmission submodule, the first media stream transmission submodule may correct an original media code rate according to a media code rate requested in the media code rate setting request, and then transmit the corrected media code rate to the first video coding submodule. The first video coding submodule may perform coding processing on the game picture by using the corrected media code rate. For another example, if the second client accessing the cloud gaming instance transmits a media frame rate setting request to the second media stream transmission submodule, the second media stream transmission submodule may correct an original media frame rate according to a media frame rate requested in the media frame rate setting request, and then transmit the corrected media frame rate to the second video coding submodule. The second video coding submodule may perform coding processing on the game picture by using the corrected media frame rate. In this manner, the client can adjust the transmission parameter in real time according to a requirement, and the stream processing resource bound to the client can adjust or correct the transmission parameter in real time according to an adjustment requirement of the client, which is very flexible and efficient.

(5) Transmission Monitoring

An observer client accessing a cloud gaming instance may share a stream processing resource in the cloud gaming instance. The observer client may be a client used by a tester of cloud gaming, and the observer client is configured to monitor a data transmission process based on the stream processing resource. Specifically, when the observer client receives an access request for the cloud gaming instance, one stream processing resource may be selected from existing stream processing resources of the cloud gaming instance, and the selected stream processing resource is bound to the observer client. Selecting one stream processing resource from the existing stream processing resources of the cloud gaming instance may refer to randomly selecting one stream processing resource from the existing stream processing resources of the cloud gaming instance for binding. For example, if the existing stream processing resources of the cloud gaming instance are the first stream processing resource and the second stream processing resource, one stream may be randomly selected from the first stream processing resource and the second stream processing resource, for example, the first stream processing resource is selected for being bound to the observer client. Selecting one stream processing resource from the existing stream processing resources of the cloud gaming instance may further refer to selecting a specified stream processing resource from the existing stream processing resources of the cloud gaming instance for binding. For example, the existing stream processing resources of the cloud gaming instance are the first stream processing resource and the second stream processing resource. Assuming that the specified stream processing resource is the first stream processing resource, the observer client may be bound to the first stream processing resource. After the observer client receives the first media stream transmitted by the first media stream transmission submodule, the observer client may parse and display a game picture in the first media stream, so as to verify whether the game picture is clear and smooth. In addition, the observer client only observes the game picture, and does not participate in traffic control. Therefore, the observer client can effectively reduce resource consumption and save transmission bandwidth by sharing the first stream processing resource with the first client.

In this embodiment of this application, the cloud gaming server allows a plurality of clients to access and operate the same cloud gaming instance, thereby effectively improving flexibility and diversity of the cloud gaming operation mode. In addition, the cloud gaming server creates and binds an independent stream processing resource to each client of a plurality of clients that access the same cloud gaming instance, and any stream processing resource may perform data transmission between a client bound to the stream processing resource and the cloud gaming instance, thereby efficiently and stably performing data transmission. In addition, any stream processing resource may perform targeted and independent traffic control on a client bound to the stream processing resource, so as to effectively reduce a delay generated in a media stream transmission process, and effectively improve definition and fluency of the media stream. When a client does not have the operation permission for the cloud gaming instance, a stream processing resource bound to the client may perform permission control on the client in a manner of discarding operation data, thereby facilitating permission control on each client of the cloud gaming instance. In addition, the client can adjust the transmission parameter in real time according to a requirement, and the stream processing resource bound to the client can adjust or correct the transmission parameter in real time according to an adjustment requirement of the client, which is very flexible and efficient.

The cloud gaming processing solution proposed in this embodiment of this application may further be combined with a blockchain. For example, a client of cloud gaming or a cloud gaming server may be a node in a blockchain network. In this embodiment of this application, a process of binding between the client and the stream processing resource, and a process of data transmission between the client and the cloud gaming instance based on the stream processing resource may be uploaded to the blockchain for storage. For example, the media stream and operation data involved in this embodiment of this application may be stored in the blockchain in a form of a block. For another example, a binding relationship between the client and the stream processing resource may be stored in the blockchain in a form of a block. Based on a feature that a block in the blockchain cannot be tampered with or forged, the binding process between the client and the stream processing resource is more secure and reliable, and the data transmission process based on the stream processing resource between the client and the cloud gaming instance is more secure and reliable.

It is to be understood that, the cloud gaming processing system described in the embodiments of this application is intended to more clearly describe the technical solutions in the embodiments of this application, and do not constitute a limitation on the technical solutions provided in the embodiments of this application. A person of ordinary skill in the art may learn that, with evolution of the system and appearance of a new service scenario, the technical solutions provided in the embodiments of this application also apply to a similar technical problem.

Figure 4:
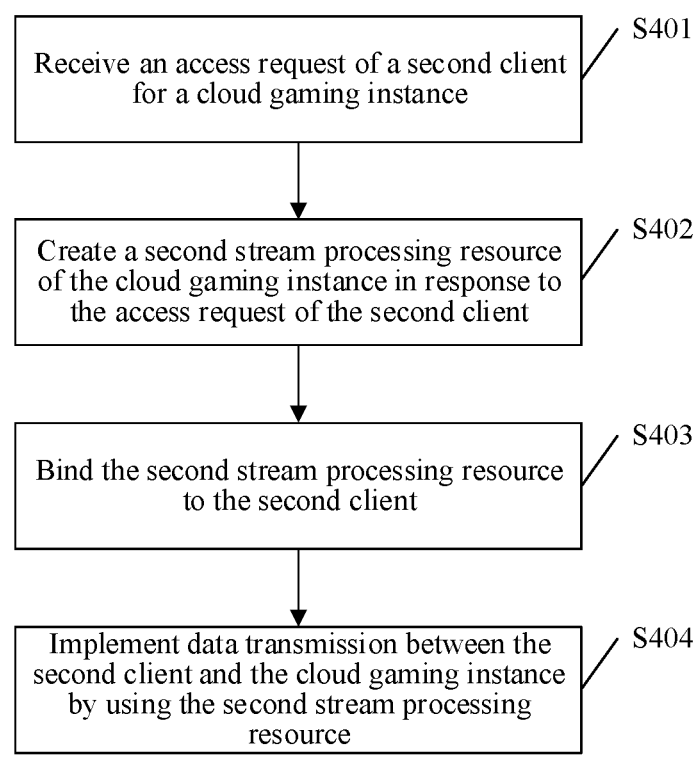
FIG. 4 is a schematic flowchart of a cloud gaming processing method according to an exemplary embodiment of this application.

Based on the foregoing description, FIG. 4 is a schematic flowchart of a cloud gaming processing method according to an exemplary embodiment of this application. The cloud gaming processing method may be performed by a cloud gaming processing device provided in the embodiment of this application. The cloud gaming processing device may be the cloud gaming server 304 in the cloud gaming processing system 30 shown in FIG. 3. The cloud gaming processing method may include the following S401 to S404:

S401. Receive an access request of a second client for a cloud gaming instance.

The cloud gaming instance is created according to a play request of a first client for a cloud gaming, the first client is bound to a first stream processing resource of the cloud gaming instance, and data transmission between the cloud gaming instance and the first client is implemented by using the first stream processing resource. Specifically, when the cloud gaming server receives the play request of the first client for the cloud gaming, a quantity of cloud gaming instances created in the cloud gaming may be obtained. If the quantity of cloud gaming instances that have been created in the cloud gaming does not exceed (that is, is less than or equal to) an instance creation threshold, the cloud gaming server may create a cloud gaming instance according to the play request of the first client for the cloud gaming, create the first stream processing resource, bind the first stream processing resource to the first client, and perform data transmission between the cloud gaming instance and the first client based on the first stream processing resource. The instance creation threshold may refer to an upper limit of the quantity of cloud gaming instances that are allowed to be created for cloud gaming, for example, the upper limit of the quantity of cloud gaming instances that are allowed to be created for cloud gaming is 50,000. If the quantity of cloud gaming instances that have been created in the cloud gaming exceeds (that is, is greater than) the instance creation threshold, a processor of the cloud gaming may return a cloud gaming instance creation failure notification to the first client. For the first client, after receiving the cloud gaming instance creation failure notification, the first client may re-initiate a play request for the cloud gaming. The first client may also queue until the quantity of cloud gaming instances that have been created in the cloud gaming does not exceed (that is, is less than or equal to) the instance creation threshold, and the cloud gaming server creates the cloud gaming instance.

The implementing data transmission between the cloud gaming instance and the first client by using the first stream processing resource may include: acquiring a media stream in the cloud gaming instance; transmitting the media stream (for example, the foregoing first media stream) to the first client by using the first stream processing resource; and receiving, when the first client requests to operate the cloud gaming instance, operation data of the first client by using the first stream processing resource.

The access request of the second client for the cloud gaming instance is triggered to be transmitted by using a sharing password. Specifically, the cloud gaming server receives a sharing request of the first client for the cloud gaming instance. After receiving the sharing request of the first client for the cloud gaming instance, the cloud gaming server may return a sharing password of the cloud gaming instance to the first client in response to the sharing request of the first client, so that the first client shares the sharing password to another client other than the first client. In an implementation, after receiving the sharing password of the cloud gaming instance returned by the cloud gaming server, the first client may share the sharing password with the second client. After receiving the sharing password shared by the first client, the second client may input the sharing password into the second client, for example, may input the sharing password into a cloud gaming participation interface of the second client, so as to trigger the second client to transmit an access request for the cloud gaming instance to the cloud gaming server. In another implementation, the sharing password may refer to a participating link of the cloud gaming. The second client may trigger, by directly tapping on the sharing password shared by the first client, an access request for the cloud gaming instance to be transmitted to the cloud gaming server. The sharing password may include an identifier of the cloud gaming instance and a login password of the cloud gaming instance. The identifier of the cloud gaming instance may be used for identifying the cloud gaming instance, that is, it can be ensured that the cloud gaming instance that the second client requests to access is a cloud gaming instance shared by the first client. The login password of the cloud gaming instance may be used for verifying an identity of the second client. For example, the login password of the cloud gaming instance entered by the second client may be compared with the login password of the cloud gaming instance stored in the cloud gaming server. If the two are the same, the verification succeeds, and the second client is allowed to access the cloud gaming instance. If the two are different, the verification fails, and the second client is prohibited to access the cloud gaming instance. The identity of the second client is verified by using the login password of the cloud gaming instance, which can ensure that the second client accessing the cloud gaming instance is trusted.

S402. Create a second stream processing resource of the cloud gaming instance in response to the access request of the second client.

After the second client receives the access request for the cloud gaming instance, a second stream processing resource of the cloud gaming instance may be created in response to the access request of the second client. As shown in the foregoing embodiment shown in FIG. 2, the second stream processing resource may be provided by the second video coding submodule and the second media stream transmission submodule. The second video coding submodule may be configured to perform coding processing on a game picture of a collected cloud gaming instance, and transmit a second video stream obtained through coding to the second media stream transmission submodule. The second media stream transmission submodule may be configured to transmit a second media stream composed of a second video stream and an audio stream to the second client, and the first stream processing resource and the second stream processing resource are independent of each other.

The access request of the second client may include a user identifier (user ID2) of the second client and a first access policy (Exclusive policy), and the first access policy may be used for indicating that a type of the second client is a user type. In this case, creating the second stream processing resource of the cloud gaming instance may include: allocating an access session identifier (SDK Session ID2) to the second client according to the user identifier of the second client; and generating the second stream processing resource of the cloud gaming instance and an identifier (CG Session ID2) of the second stream processing resource according to the first access policy, where the second stream processing resource and the corresponding identifier may be generated in real time.

S403. Bind the second stream processing resource to the second client.

After the second stream processing resource of the cloud gaming instance is created, the second stream processing resource may be bound to the second client. Binding the second stream processing resource to the second client refers to: establishing a binding relationship between the access session identifier of the second client and the identifier of the second stream processing resource, so as to implement binding of the second stream processing resource to the second client.

S404. Implement data transmission between the second client and the cloud gaming instance by using the second stream processing resource.

After the second stream processing resource is bound to the second client, data transmission may be implemented between the second client and the cloud gaming instance by using the second stream processing resource. The implementing data transmission between the second client and the cloud gaming instance by using the second stream processing resource may include: acquiring a media stream (for example, the foregoing second media stream) in the cloud gaming instance; transmitting the media stream to the second client by using the second stream processing resource; and receiving, when the second client requests to operate the cloud gaming instance, operation data of the second client by using the second stream processing resource.

Figure 5:
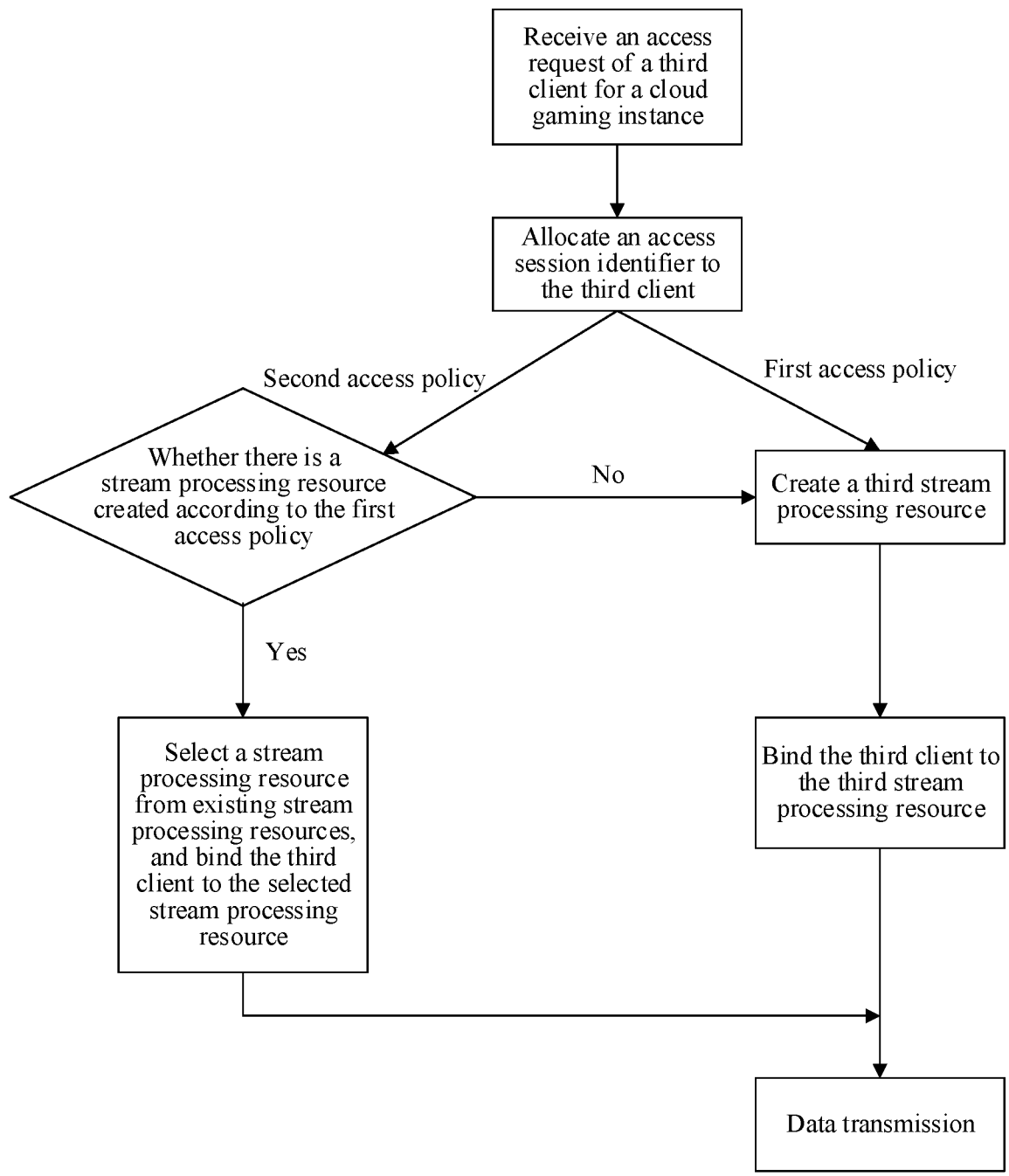
FIG. 5 is a schematic flowchart of a response process of an access request of a client according to an exemplary embodiment of this application.

A third client may be a client that requests to access the cloud gaming instance except the first client and the second client. The cloud gaming server may receive an access request of the third client for the cloud gaming instance. The access request of the third client may carry a user identifier (user ID3) of the third client and an access policy. For a response process of the cloud gaming server to the access request of the third client, refer to FIG. 5. FIG. 5 is a schematic flowchart of a response process of an access request of a client according to an exemplary embodiment of this application. As shown in FIG. 5, if the access policy is a first access policy, the cloud gaming server may respond to the access request of the third client, create a third stream processing resource of the cloud gaming instance, bind the third stream processing resource to the third client, and perform data transmission based on the third stream processing resource between the third client and the cloud gaming instance. In another implementation, if the access policy is a second access policy (Shared policy), the cloud gaming server may check whether a stream processing resource created according to the first access policy exists in the cloud gaming instance. The second access policy may be used for indicating that a type of the third client is an observer (for example, the third client may be the observer client mentioned in the foregoing embodiment). If the stream processing resource created according to the first access policy exists in the cloud gaming instance, for example, the first stream processing resource and the second stream processing resource already exist in the cloud gaming instance, one stream processing resource may be selected from the first stream processing resource and the second stream processing resource in response to the access request of the third client. The selected one stream processing resource is bound to the third client. Data transmission is performed between the third client and the cloud gaming instance based on the selected one stream processing resource. The selecting one stream processing resource from the first stream processing resource and the second stream processing resource of the cloud gaming instance may be randomly selecting one stream processing resource from the first stream processing resource and the second stream processing resource of the cloud gaming instance, for example, the first stream processing resource may be selected. Selecting one stream processing resource from the first stream processing resource and the second stream processing resource of the cloud gaming instance may further refer to selecting a specified one stream processing resource from the first stream processing resource and the second stream processing resource of the cloud gaming instance. Assuming that the specified stream processing resource is the first stream processing resource, the selected stream processing resource is the first stream processing resource. If the stream processing resource created according to the first access policy does not exist in the cloud gaming instance, the third stream processing resource of the cloud gaming instance may be created in response to the access request of the third client, the third stream processing resource is bound to the third client, and data transmission is performed between the third client and the cloud gaming instance based on the third stream processing resource. The creating a third stream processing resource of the cloud gaming instance, and binding the third stream processing resource to the third client may refer to: allocating an access session identifier (SDK Session ID3) to the third client according to the user identifier of the third client; generating the third stream processing resource of the cloud gaming instance and an identifier (CG Session ID3) of the third stream processing resource according to the first access policy; and establishing a binding relationship between the access session identifier of the third client and the identifier of the third stream processing resource. In an example in which the first stream processing resource is selected from the first stream processing resource and the second stream processing resource, binding the selected one stream processing resource to the third client may refer to: establishing a binding relationship between the access session identifier of the third client and the identifier (CG Session ID1) of the first stream processing resource.

In this embodiment of this application, a plurality of clients (for example, the first client and the second client) may be allowed to access and operate the same cloud gaming instance, thereby effectively improving flexibility and diversity of a cloud gaming operation mode. In addition, a separate stream processing resource may be created and bound to each client of a plurality of clients that access the same cloud gaming instance, and any stream processing resource of the cloud gaming instance may be used for performing data transmission between a client bound to the stream processing resource and the cloud gaming instance. In this way, targeted and independent coding traffic control and quality control can be performed on each client based on each stream processing resource, and because stream processing resources are independent of each other and do not affect each other, data transmission can be performed efficiently and stably between the client and the cloud gaming instance. Using the second client as an example, a binding relationship between the second client and the second stream processing resource may be established, and when operation data of the second client is received, the second stream processing resource bound to the second client may be quickly determined based on the binding relationship, and the operation data of the second client is injected into the cloud gaming instance by using the second stream processing resource. When a media stream of the cloud gaming instance is obtained, a second client bound to the second stream processing resource may be quickly determined based on the binding relationship, so that the media stream can be quickly forwarded to the second client by using the second stream processing resource, thereby effectively improving accuracy of a data transmission process and reducing a delay in a data transmission process.

Figure 6:
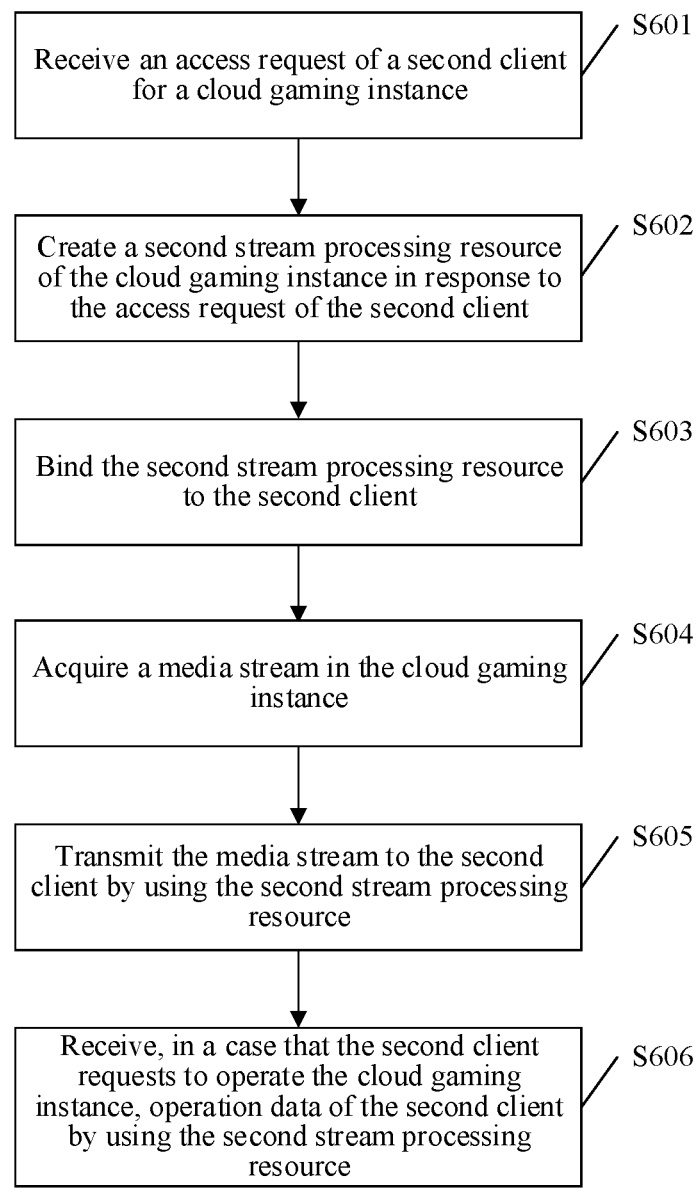
FIG. 6 is a schematic flowchart of a cloud gaming processing method according to another exemplary embodiment of this application.

Based on the foregoing description, FIG. 6 is a schematic flowchart of a cloud gaming processing method according to another exemplary embodiment of this application. The cloud gaming processing method may be performed by a cloud gaming processing device provided in the embodiment of this application. The cloud gaming processing device may be the cloud gaming server 304 in the cloud gaming processing system 30 shown in FIG. 3. The cloud gaming processing method may include the following S601 to S606:

S601. Receive an access request of a second client for a cloud gaming instance.

The cloud gaming instance is created according to a play request of a first client for a cloud gaming, the first client is bound to a first stream processing resource of the cloud gaming instance, and data transmission between the cloud gaming instance and the first client is implemented by using the first stream processing resource.

S602. Create a second stream processing resource of the cloud gaming instance in response to the access request of the second client.

The access request of the second client may include a user identifier of the second client and a first access policy, and the first access policy may be used for indicating that a type of the second client is a user type. In this case, creating the second stream processing resource of the cloud gaming instance may include: allocating an access session identifier to the second client according to the user identifier of the second client; and generating the second stream processing resource of the cloud gaming instance and an identifier of the second stream processing resource according to the first access policy.

S603. Bind the second stream processing resource to the second client.

After the second stream processing resource of the cloud gaming instance is created, the second stream processing resource may be bound to the second client. Binding the second stream processing resource to the second client refers to: establishing a binding relationship between the access session identifier of the second client and the identifier of the second stream processing resource, so as to implement binding of the second stream processing resource to the second client.

S604. Acquire a media stream in the cloud gaming instance.

S605. Transmit the media stream to the second client by using the second stream processing resource.

S606. Receive, when the second client requests to operate the cloud gaming instance, operation data of the second client by using the second stream processing resource.

The cloud gaming instance can support real-time transmission parameter adjustment. A client that accesses the cloud gaming instance may transmit a transmission parameter setting request to the cloud gaming server. The cloud gaming server responds to the transmission parameter setting request, and may correct an original transmission parameter; and may encode and process a game picture by using the corrected transmission parameter. The transmission parameter may include at least one of the following: a media code rate, a media frame rate, and a resolution. The media code rate may be a quantity of bits of a media stream transmitted within a unit time (for example, 1 second). The higher the media code rate, the clearer picture quality of the game picture. The lower the media code rate, the less clear the picture quality of the game picture. The frame rate of the media frame may be a quantity of media frames in an encoded media stream within a unit time (for example, 1 second). The higher the frame rate of the media frame, the smoother the game picture. The lower the frame rate of the media frame, the more freezing the game picture. The resolution may include a device resolution and a coding resolution. The device resolution may also be referred to as a display resolution, which refers to a quantity of horizontal pixels and a quantity of vertical pixels on all visible areas on a display screen of a device. For example, the device resolution is 720×960, which indicates that 720 pixels are horizontally and 960 pixels are vertically displayed on all visible areas of the display screen of the device. The device code rate cannot be changed once determined. The coding resolution may be a quantity of horizontal pixels and a quantity of vertical pixels in an encoded game picture. For example, the coding resolution is 720×960, indicating that 720 pixels are horizontally and 960 pixels are vertically displayed in the encoded game picture.

For the resolution in the transmission parameter, after the first client accesses the cloud gaming instance, the cloud gaming server may receive, based on the first stream processing resource, the device resolution transmitted by the first client. The device resolution may be a device resolution of a first terminal running the first client, and the device resolution of the first terminal may be a quantity of horizontal pixels and a quantity of vertical pixels on all visible areas of a display screen of the first terminal. For example, the device resolution of the first terminal is 720×960, which indicates that 720 pixels are horizontally and 960 pixels are vertically displayed on all visible areas of the display screen of the first terminal. After the device resolution transmitted by the first client is received, the cloud gaming server may set a docker window resolution of the cloud gaming instance according to the device resolution, and the setting the docker window resolution of the cloud gaming instance according to the device resolution may include: setting a first ratio of the cloud gaming instance to be the same as a second ratio of the first terminal, where the first ratio is a ratio of a quantity of horizontal pixels to a quantity of vertical pixels in the docker window of the cloud gaming instance, and the second ratio is a ratio of the quantity of horizontal pixels to the quantity of vertical pixels in the display screen of the first terminal. For example, if the device resolution of the first terminal is 720×960, the docker window resolution of the cloud gaming instance may be set to 1080×1440, and the ratio of the quantity of horizontal pixels to the quantity of vertical pixels is 0.75. The cloud gaming server may further transmit the docker window resolution to the first client based on the first stream processing resource. When the first client requests to operate the cloud gaming instance, coordinate conversion may be performed on operation touchscreen coordinates according to the device resolution and the docker window resolution. For example, first operation touchscreen coordinates in the device resolution may be converted into second operation touchscreen coordinates in the docker window resolution.

The docker window resolution of the cloud gaming instance cannot be changed once determined. If a third ratio in the coding resolution set by the client accessing the cloud gaming instance is different from the first ratio, the game picture in the encoded media stream is stretched and deformed. Therefore, the third ratio in the coding resolution set by the client needs to be kept the same as the first ratio in the cloud gaming instance. The third ratio is a ratio of a quantity of horizontal pixels to a quantity of vertical pixels in the coding resolution set by the client. The second client is used as an example. After the second client accesses the cloud gaming instance, the cloud gaming server may transmit the docker window resolution to the second client based on the second stream processing resource. When the second client requests to operate the cloud gaming instance, coordinate conversion may be performed on operation touchscreen coordinates according to the device resolution and the docker window resolution. The cloud gaming server may further receive, based on the second stream processing resource, a resolution setting request transmitted by the second client, where the resolution setting request may carry a coding resolution that is requested to be set by the second client. The cloud gaming server may correct, according to the docker window resolution, the coding resolution that is requested to be set; and may perform, by using the corrected coding resolution, coding processing on a media stream transmitted based on the second stream processing resource. That the cloud gaming server may correct, according to the docker window resolution, the coding resolution that is requested to be set may include: The third ratio of the coding resolution that is requested to be set is set to be the same as the first ratio of the cloud gaming instance. For example, if the coding resolution requested by the second client is 480P, the coding resolution requested to be set may be corrected according to the docker window resolution 1080×1440, and the corrected coding resolution is 480×640.

Figure 7A:
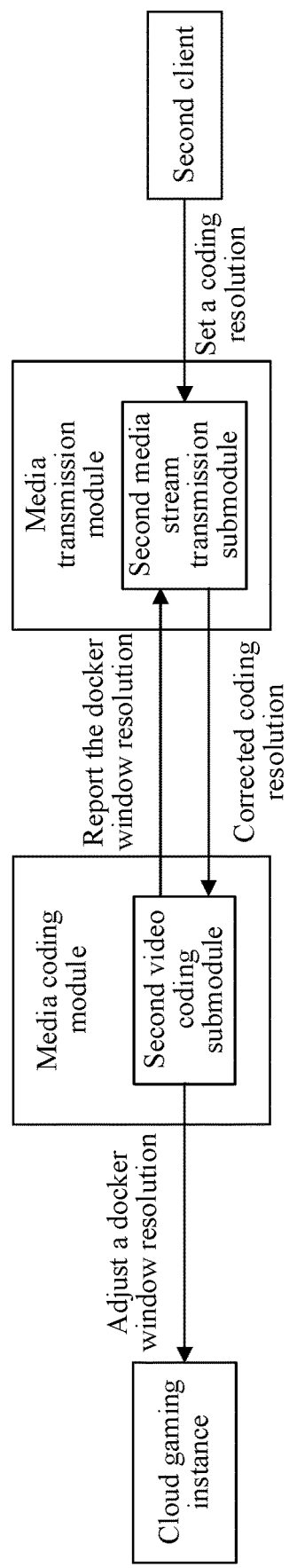
FIG. 7A is a schematic flowchart of a resolution setting process according to an exemplary embodiment of this application.

For a resolution setting process, refer to FIG. 7A. FIG. 7A is a schematic flowchart of a resolution setting process according to an exemplary embodiment of this application. The second client is used as an example. After the docker window resolution of the cloud gaming instance is determined, the second video coding submodule may transmit the docker window resolution of the cloud gaming instance to the second media stream transmission submodule. For example, the docker window resolution of the cloud gaming instance is 1080×1440. After the second media stream transmission submodule receives the coding resolution requested to be set by the second client, the second media stream transmission submodule may correct the coding resolution requested to be set according to the docker window resolution to obtain the corrected coding resolution. For example, the coding resolution requested to be corrected is 480P, and the corrected coding resolution is 480×640. Then the second media stream transmission submodule may transmit the corrected coding resolution to the second video coding submodule, and the second video coding submodule may perform, by using the corrected coding resolution, coding processing on a media stream to be transmitted to the second client.

It may be learned from the foregoing description of real-time transmission parameter adjustment that the cloud gaming server may adjust or correct the transmission parameter in real time according to the transmission parameter setting request of the client accessing the cloud gaming instance, so as to better meet a transmission parameter setting requirement of the client accessing the cloud gaming instance, which is very flexible and efficient.

The cloud gaming instance may further support traffic control in a data transmission process. The cloud gaming server may transmit a network probe packet to the second client based on the second stream processing resource, and receive network information returned by the second client. The network probe packet refers to a probe tool package that can be used for detecting a network congestion situation. The network information refers to network congestion information. Then, the cloud gaming server may adjust a data volume of the network probe packet according to the network information, and adjust the transmission parameter of the second stream processing resource. The adjusting a data volume of the network probe packet according to the network information, and adjusting a transmission parameter of the second stream processing resource may include: reducing the data volume of the network probe packet, and performing first adjustment on the transmission parameter of the second stream processing resource when the network information indicates that network congestion has occurred; and increasing the data volume of the network probe packet, and performing second adjustment on the transmission parameter of the second stream processing resource when the network information indicates that network congestion does not occur; the first adjustment may include at least one of the following: reducing a media code rate in the second stream processing resource, reducing a frame rate of a media frame in the second stream processing resource, or discarding some media frames in the second stream processing resource; and the second adjustment may include at least one of the following: increasing a media code rate in the second stream processing resource or increasing a frame rate of a media frame in the second stream processing resource.

Figure 7B:
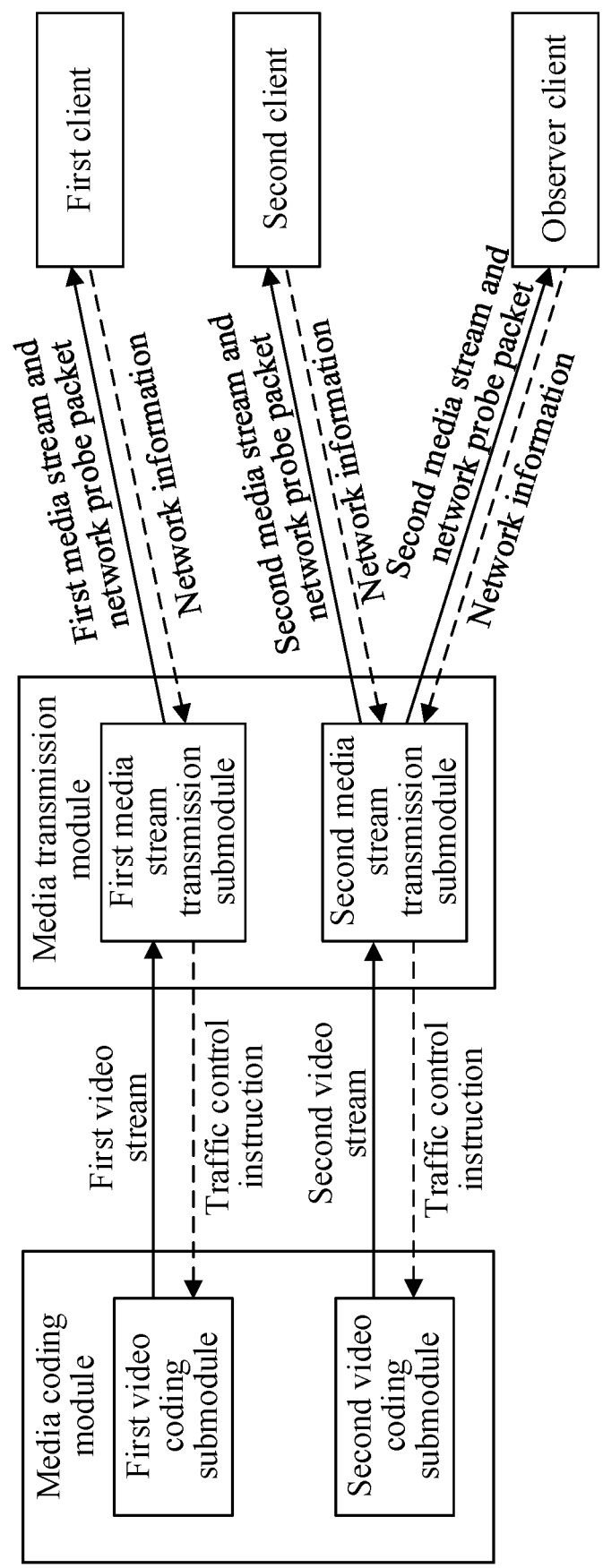
FIG. 7B is a schematic flowchart of a traffic control process according to an exemplary embodiment of this application.

For a traffic control process, refer to FIG. 7B. FIG. 7B is a schematic flowchart of a traffic control process according to an exemplary embodiment of this application. A traffic control process between the second client and the cloud gaming instance is used as an example for description herein. A traffic control process between the first client and the cloud gaming instance is similar to the traffic control process between the second client and the cloud gaming instance. Details are not described herein again. The traffic control process shown in FIG. 7B may include the following steps: After a second video coding submodule of a second stream processing resource transmits an encoded second video stream to a second media stream transmission submodule of a second stream processing resource, the second media stream transmission submodule may transmit the second media stream including a second video stream and an audio stream to the second client. In a process of transmitting the second media stream to the second client, the second media stream transmission submodule may further transmit a network probe packet to the second client, and receive network information returned by the second client. The second media stream transmission submodule may transmit a traffic control instruction to the second video coding submodule according to the network information. If the network information indicates that no network congestion occurs, the second media stream transmission submodule may transmit a first traffic control instruction to the second video coding submodule. The first traffic control instruction may be used for instructing the second video coding submodule to increase a media code rate in the second video coding submodule, increase a frame rate of a media frame in the second video coding submodule, and the like. If the network information indicates that network congestion has occurred, the second media stream transmission submodule may transmit a second traffic control instruction to the second video coding submodule. The second traffic control instruction may be used for instructing the second video coding submodule to reduce a media code rate in the second video coding submodule, reduce a frame rate of a media frame in the second video coding submodule, discard some media frames in the second media stream, and the like.

The second media stream transmission submodule may transmit the second media stream and the network probe packet to the second client by using an unreliable transmission protocol. The unreliable transmission protocol may include a Real-time Transport Protocol (RTP). Because a reliable transmission protocol Transmission Control Protocol (TCP) cannot lose a packet or packet loss retransmission causes an increased delay in a case of network congestion, transmission efficiency of TCP in a case of network congestion is low. Based on this embodiment of this application, the unreliable transmission protocol RTP may be used for transmitting a media stream and a network probe packet. The unreliable transmission protocol RTP may actively drop a packet in a case of network congestion. In this way, a transmission delay is effectively reduced in a case of network congestion. In addition, the second media stream transmission submodule may receive, by using a protocol with a feedback mechanism, the network information returned by the second client. The protocol with a feedback mechanism may include an RTP Control Protocol (RTCP), the network information may include an RTCP receiver report (RTCP RR), and the client feeds back network information once at an interval of a target time period, where the target time period may be, for example, 100 milliseconds.

Figure 7C:
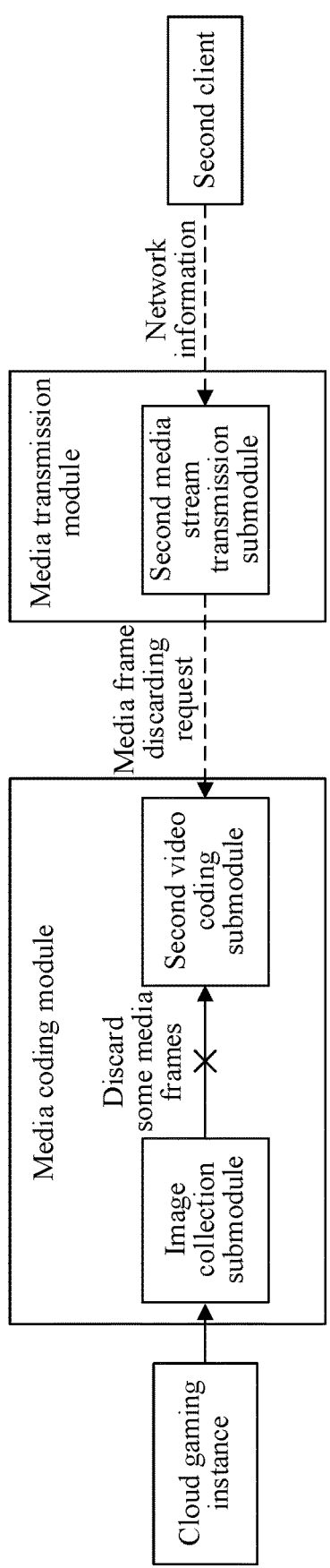
FIG. 7C is a schematic flowchart of a media frame discarding process according to an exemplary embodiment of this application.

Because it takes a period of time for the second video coding submodule to adjust the transmission parameter such as the media code rate and the media frame rate in response to the traffic control instruction, when sudden network congestion occurs, adjusting the transmission parameter may cause a delay. Generally, a manner of discarding some media frames in the media stream is used for rapidly reducing the media code rate. FIG. 7C is a schematic flowchart of a media frame discarding process according to an exemplary embodiment of this application. As shown in FIG. 7C, when network information indicates sudden network congestion, the second media stream transmission submodule may transmit a media frame discarding request to the second video coding submodule. Then, in response to the media frame discarding request, the second video coding submodule may discard some collected media frames according to a frame discarding policy after the image collection submodule collects the game picture. Discarding some collected media frames according to the frame discarding policy may refer to discarding some collected media frames according to a target ratio, where the target ratio may be one third, one tenth, one two-hundredth, or the like of a quantity of media frames collected by the image collection submodule. When the network information indicates that no network congestion occurs, the foregoing frame discarding policy may be disabled.

It may be learned from the foregoing description about traffic control that, the media coding module and the media transmission module in the cloud gaming server may jointly perform traffic control, which can effectively reduce the transmission delay of the media stream, improve quality of the game picture in the media stream, and perform efficient and stable data transmission between the client and the cloud gaming instance.

The cloud gaming instance may further support permission control in a data transmission process. The cloud gaming server may configure a permission for the second client according to a permission setting request of the first client, where the permission may include at least one of the following: an operation permission for the cloud gaming instance or a browsing permission for the cloud gaming instance. The operation permission for the cloud gaming instance refers to a permission to operate the cloud gaming instance. The browsing permission for the cloud gaming instance refers to a permission to browse the game picture of the cloud gaming instance. A user with a browsing permission for the cloud gaming instance can only browse a game picture of another user operating the cloud gaming instance, and cannot operate the cloud gaming instance. If the second client does not have the operation permission for the cloud gaming instance, when receiving the operation data of the second client based on the second stream processing resource, the cloud gaming server may discard the operation data of the second client. If the second client has the operation permission for the cloud gaming instance, when receiving the operation data of the second client based on the second stream processing resource, the cloud gaming server may inject the operation data of the second client into the cloud gaming instance. The operation data may include at least one of the following: touch operation data (for example, may be the foregoing operation touchscreen coordinates), text input data, voice input data, Global Positioning System (GPS) data, sensor data, or the like.

Figure 7D:
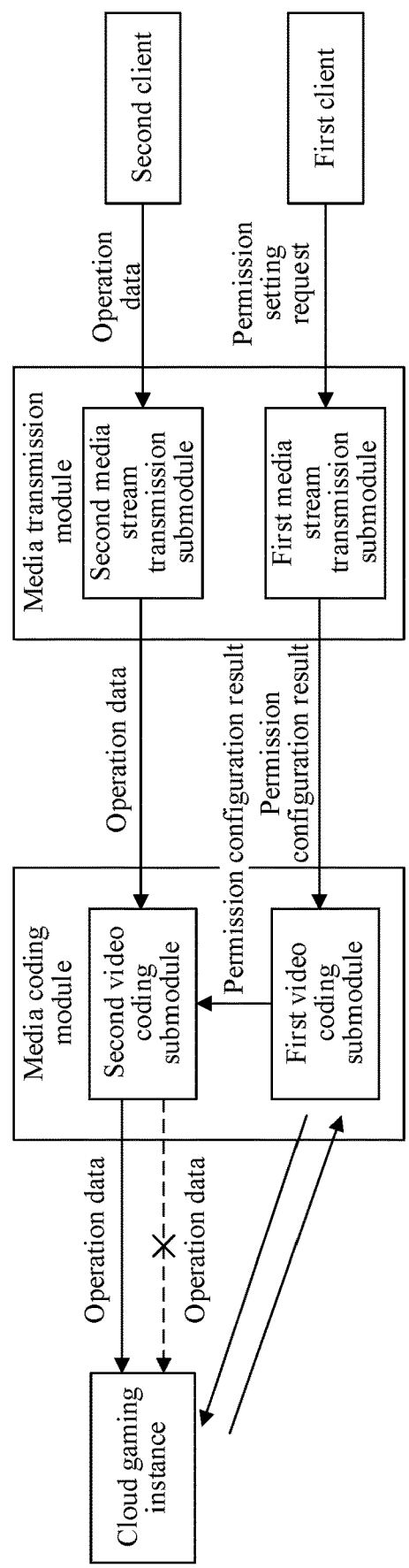
FIG. 7D is a schematic flowchart of a permission control process according to an exemplary embodiment of this application.

FIG. 7D is a schematic flowchart of a permission control process according to an exemplary embodiment of this application. As shown in FIG. 7D, the first media stream transmission transport submodule provides a permission setting interface (HTTP Restful interface). The first client may transmit a permission setting request to the first media stream transmission transport submodule by using the permission setting interface of the first media stream transmission transport submodule, and request to configure a permission for the second client, so that the first media stream transmission transport submodule may configure a permission for the second client according to the permission setting request of the first client, and transmit a permission configuration result to the first video coding submodule. The first video coding submodule may forward the permission configuration result to the second video coding submodule. If the permission configuration result indicates that the second client does not have the operation permission for the cloud gaming instance, the second video coding submodule may discard the operation data of the second client. If the permission configuration result indicates that the second client has the operation permission for the cloud gaming instance, the second video coding submodule may inject the operation data of the second client into the cloud gaming instance to operate the cloud gaming instance.

It may be learned from the foregoing description about permission control that permission control of the cloud gaming instance is implemented by injecting operation data or discarding operation data. Operation data of a client that has operation permission for the cloud gaming may be injected into the cloud gaming instance, and operation data of a client that does not have operation permission for the cloud gaming is discarded in a transmission process, thereby effectively enriching an operation mode of the cloud gaming.

Figure 7E:
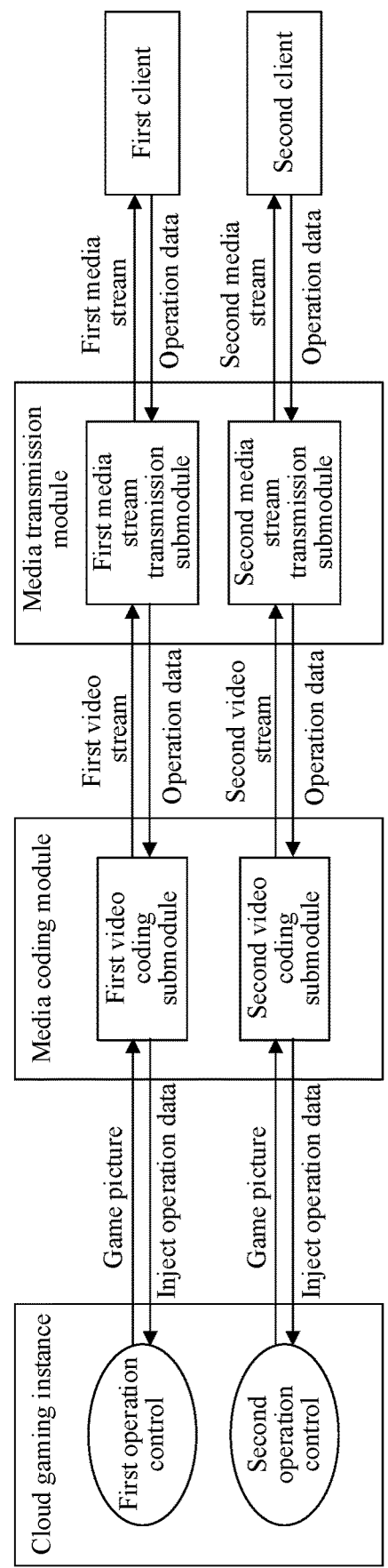
FIG. 7E is a schematic flowchart of operating a cloud gaming instance by a plurality of users according to an exemplary embodiment of this application.

The cloud gaming instance may further support simultaneous operations by a plurality of users. In this case, that two users, that is, the first client and the second client, operate the cloud gaming instance is used as an example. The first client may be mapped to a first operation control in the cloud gaming instance, and the second client may be mapped to a second operation control in the cloud gaming instance. Both the first operation control and the second operation control may be joysticks in the cloud gaming instance. FIG. 7E is a schematic flowchart of operating a cloud gaming instance by a plurality of users according to an exemplary embodiment of this application. As shown in FIG. 7E, when receiving operation data of the first client based on the first stream processing resource, the processor of the cloud gaming may inject the operation data of the first client into the first operation control, so as to control the first operation control to operate the cloud gaming instance; Specifically, when the first client requests to operate the cloud gaming instance, the first media stream transmission submodule may receive the operation data of the first client, and transmit the received operation data of the first client to the first video coding submodule. The first video coding submodule may inject the operation data of the first client into the first operation control, so as to control the first operation control to operate the cloud gaming instance. When the first video coding submodule acquires a game picture of the cloud gaming instance, the first video coding submodule may perform coding processing on the game picture to obtain a first video stream, and transmit the first video stream to the first media transmission submodule, and then the first media transmission submodule transmits the first media stream including a first video stream and an audio stream to the first client. When receiving the operation data of the second client based on the second stream processing resource, the cloud gaming server may inject the operation data of the second client into the second operation control, so as to control the second operation control to operate the cloud gaming instance. Specifically, when the second client requests to operate the cloud gaming instance, the second media stream transmission submodule may receive the operation data of the second client, and transmit the received operation data of the second client to the second video coding submodule. The second video coding submodule may inject the operation data of the second client into the second operation control, so as to control the second operation control to operate the cloud gaming instance. When the second video coding submodule acquires a game picture of the cloud gaming instance, the second video coding submodule may perform coding processing on the game picture to obtain a second video stream, and transmit the second video stream to the second media transmission submodule, and then the second media transmission submodule transmits the second media stream including a second video stream and an audio stream to the second client.

That the first client is mapped to the first operation control in the cloud gaming instance may include the following two cases: There is a mapping relationship between an identifier of the first stream processing resource and an identifier of the first operation control, that is, a binding relationship is established between the identifier of the first stream processing resource and the identifier of the first operation control. Alternatively, the operation data transmitted by the first client carries the identifier of the first operation control. That the second client is mapped to the second operation control in the cloud gaming instance may include the following two cases: There is a mapping relationship between an identifier of the second stream processing resource and an identifier of the second operation control, that is, a binding relationship is established between the identifier of the second stream processing resource and the identifier of the second operation control. Alternatively, the operation data transmitted by the second client carries the identifier of the second operation control.

It may be learned from the foregoing description of simultaneous operations on the cloud gaming instance by a plurality of users that, the cloud gaming instance supports simultaneous injection of operation data by a plurality of clients, thereby effectively enriching an operation mode of the cloud gaming.

In this embodiment of this application, the cloud gaming server may adjust or correct the transmission parameter in real time according to the transmission parameter setting request of the client accessing the cloud gaming instance, so as to better meet a transmission parameter setting requirement of the client accessing the cloud gaming instance, which is very flexible and efficient. The media coding module and the media transmission module in the cloud gaming server may jointly perform traffic control, which can effectively reduce the transmission delay of the media stream, improve quality of the game picture in the media stream, and perform efficient and stable data transmission between the client and the cloud gaming instance. In addition, the cloud gaming instance further supports permission control. Operation data of a client that has operation permission for the cloud gaming may be injected into the cloud gaming instance, and operation data of a client that does not have operation permission for the cloud gaming is discarded in a transmission process, thereby effectively enriching an operation mode of the cloud gaming. In addition, the cloud gaming instance further supports simultaneous operations by a plurality of users, that is, a plurality of clients accessing the cloud gaming instance can inject operation data into the cloud gaming instance, thereby further enriching an operation mode of the cloud gaming.

The cloud gaming processing solution mentioned in the foregoing embodiments may be applied to two game scenarios, that is, a host user teaches cloud gaming and a plurality of Arcade game users operate cloud gaming. The following separately describes the two game scenarios.

(1) A Host User Teaches Cloud Gaming

In a game scenario in which a host user teaches cloud gaming, a first client may be a host client used by the host user, and a second client may be an audience client used by an audience user. In an actual game scenario, the audience user may include at least one, that is, the audience client may include at least one. In this embodiment of this application, a case in which one audience user is included is used as an example for description.

Figure 8A:
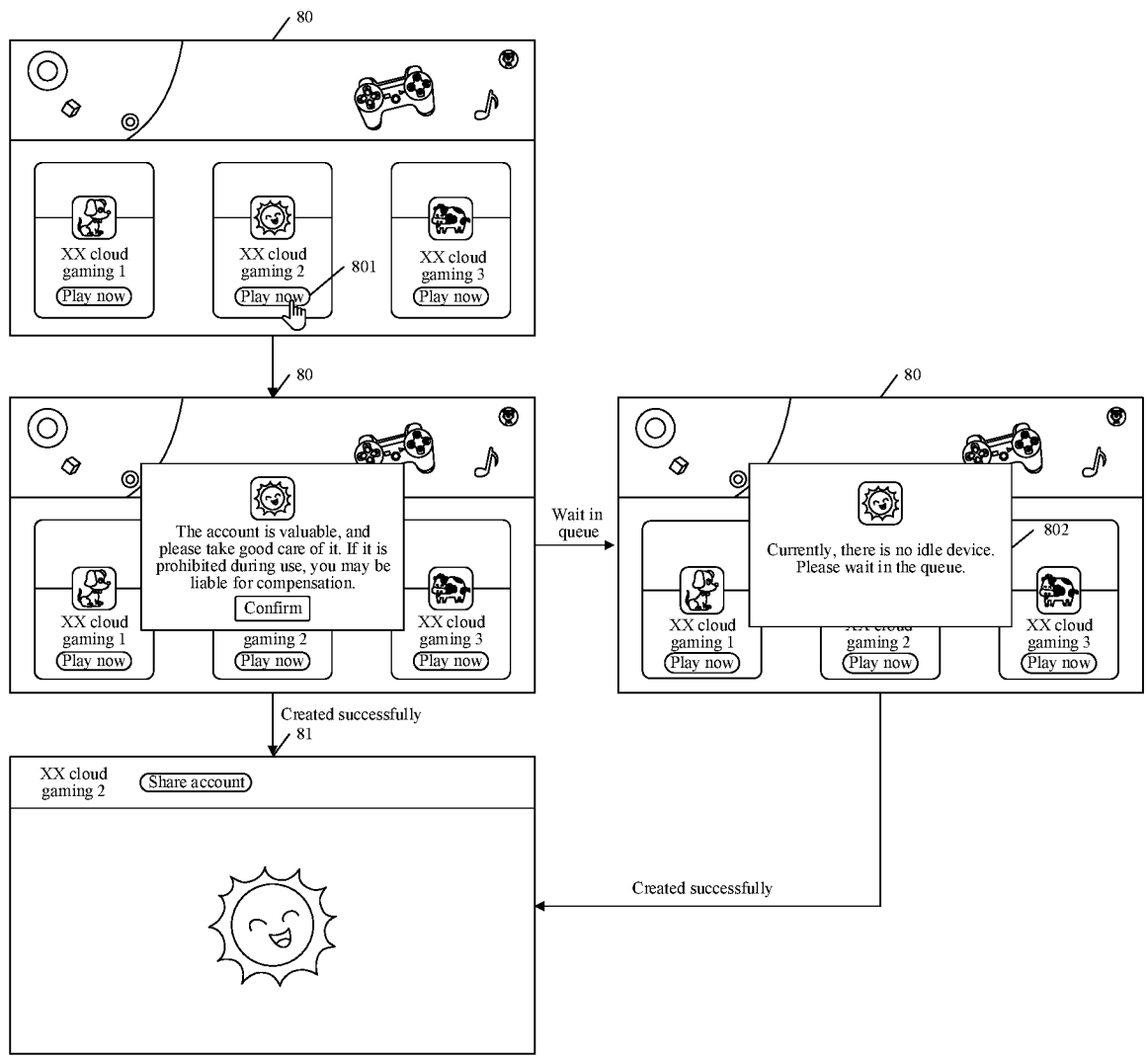
FIG. 8A is a schematic interface diagram of a cloud gaming play operation according to an exemplary embodiment of this application.

For the host user, a cloud gaming server may create a cloud gaming instance according to a play request of the host client for the cloud gaming, create a first stream processing resource of the cloud gaming instance, and bind the host client to the first stream processing resource. The cloud gaming instance and the host client may perform data transmission based on the first stream processing resource. The play request of the cloud gaming is generated in response to a cloud gaming play operation of the host user by the host client. As shown in FIG. 8A, FIG. 8A is a schematic interface diagram of a cloud gaming operation according to an exemplary embodiment of this application. A service interface 80 of the host client displays game information of a plurality of kinds of cloud gaming (for example, an icon of cloud gaming and an illustration of cloud gaming) and a game control of the cloud gaming. For example, when a game control 801 of cloud gaming 2 in the service interface 80 is selected, the client of the host user may generate a play request for the cloud gaming 2, and transmit the play request of the cloud gaming 2 to the cloud gaming server. In an implementation, if a quantity of cloud gaming instances created in the cloud gaming 2 does not exceed an instance creation threshold, the cloud gaming server may create a cloud gaming instance of the cloud gaming 2 according to the play request of the host client for the cloud gaming 2. If the cloud gaming instance is successfully created, the host client may display a game interface 81 of the cloud gaming instance of the cloud gaming 2. The instance creation threshold refers to an upper limit of a quantity of cloud gaming instances that are allowed to be created for the cloud gaming. In another implementation, if the quantity of created cloud gaming instances in the cloud gaming 2 exceeds the instance creation threshold, the processor of the cloud gaming may return a cloud gaming instance creation failure notification to the host client, and the host client may output, in the service interface 80, a creation failure prompt message 802 (for example, "there is no idle device currently in queue, please wait patiently" shown in FIG. 8A) according to the cloud gaming instance creation failure notification, and the host client needs to wait until creation qualification of the cloud gaming instance is met (that is, the quantity of created cloud gaming instances in the cloud gaming 2 does not exceed the creation threshold), and the cloud gaming server may create a game instance of the cloud gaming 2 for the play request for the cloud gaming 2. If the cloud gaming instance is successfully created, the host client may display the game interface 81 of the cloud gaming instance of the cloud gaming 2.

Figure 8B:
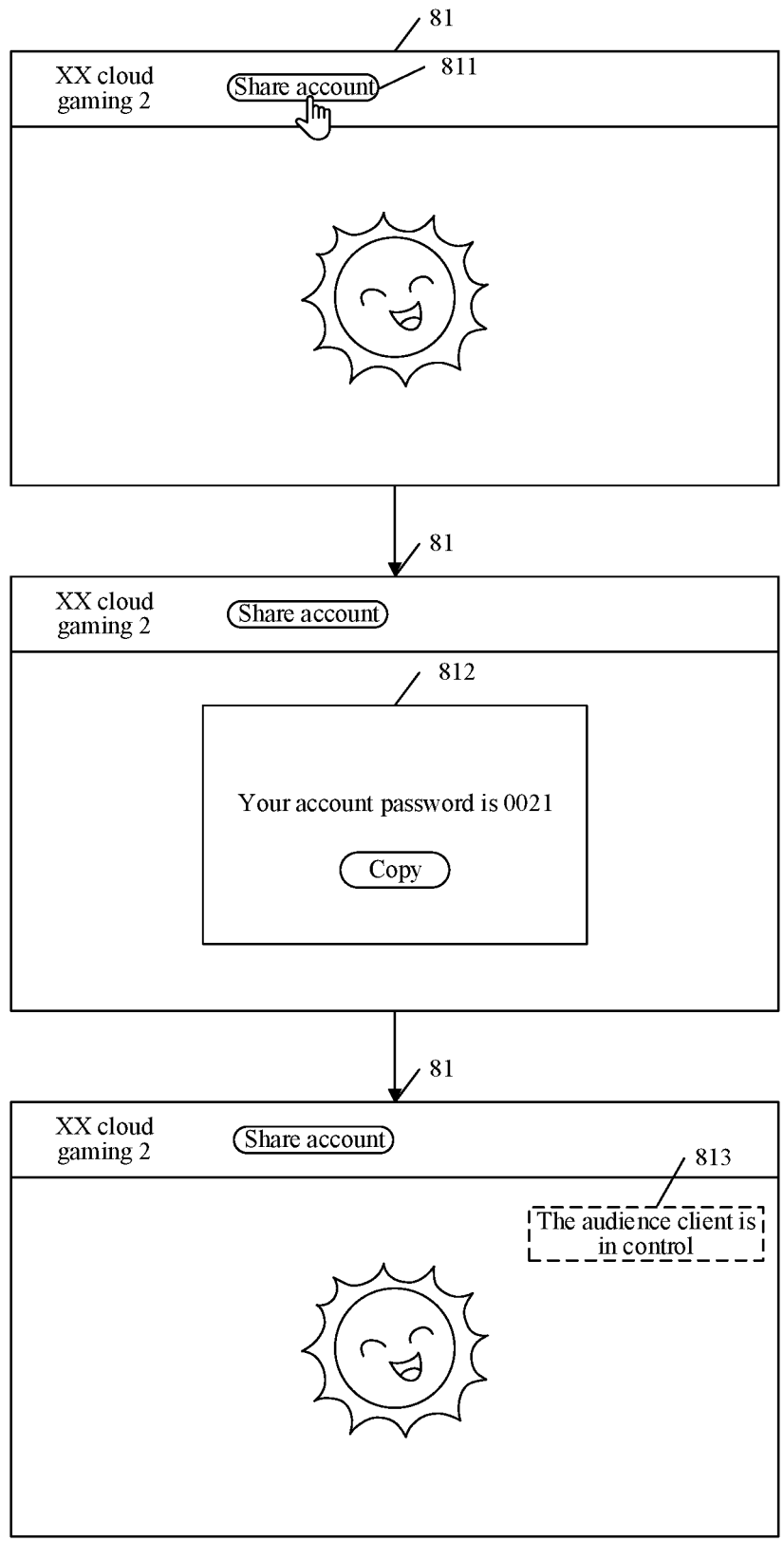
FIG. 8B is a schematic interface diagram of a cloud gaming sharing operation according to an exemplary embodiment of this application.

As shown in FIG. 8B, FIG. 8B is a schematic interface diagram of a cloud gaming sharing operation according to an exemplary embodiment of this application. After the cloud gaming instance of the cloud gaming 2 is successfully created, the game interface 81 of the cloud gaming 2 is displayed on the host client, and the game interface 81 may include a sharing control 811 of the cloud gaming instance. When the sharing control 811 of the cloud gaming instance is selected, the host client may transmit a sharing request for the cloud gaming instance to the cloud gaming server. After receiving the sharing request of the host client for the cloud gaming instance, the cloud gaming server returns a sharing password of the cloud gaming instance to the host client in response to the sharing request of the host client. In an implementation, the host client may output a sharing password of the cloud gaming instance to the game interface 81, and the sharing password may include an identifier of the cloud gaming instance and a login password of the cloud gaming instance, as shown in FIG. 8B, the sharing password 812 "Your account password is: 0021". In another implementation, the host client may transmit the sharing password of the cloud gaming instance to the audience client.

Figure 8C:
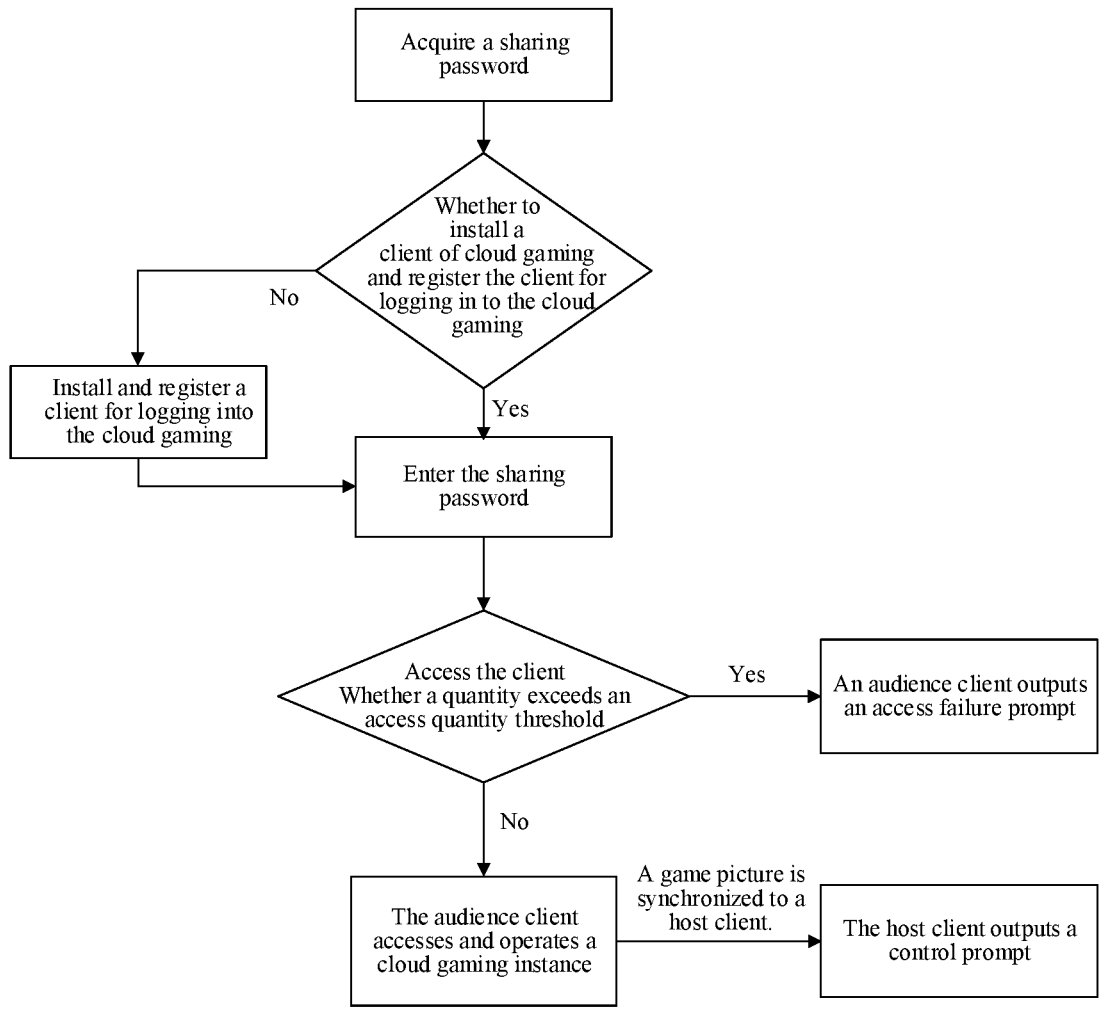
FIG. 8C is a schematic flowchart of an access process of a cloud gaming instance according to an exemplary embodiment of this application.

For the audience user, for a processing procedure of the audience user, refer to FIG. 8C. FIG. 8C is a schematic flowchart of an access procedure of a cloud gaming instance according to an exemplary embodiment of this application. As shown in FIG. 8C, when the audience user obtains the sharing password, if a terminal used by the audience user does not have a client of the cloud gaming (that is, the audience client is not installed), the audience user needs to download and install, in the terminal, a client for logging in to the cloud gaming. In an implementation, if the client of the cloud gaming is installed on the terminal of the audience user, the audience user may enter the sharing password in the audience client, for example, may enter the sharing password in a game participation interface of the audience client. After the sharing password is entered, the audience client may transmit an access request to the cloud gaming server. In another implementation, the sharing password may be a participating link of the cloud gaming. If the terminal of the audience user has the client of the cloud gaming installed on the terminal, the audience user may directly tap the sharing password in a host live streaming interface displayed on the audience client, or the audience user may directly tap the sharing password share with the audience client in the host client, and the access request may be triggered to be transmitted to the cloud gaming server. If a quantity of clients that have accessed the cloud gaming instance of the cloud gaming 2 exceeds an access quantity threshold, the cloud gaming server may return an access failure notification to the audience client. After receiving the access failure notification, the audience client may output an access failure prompt to the audience user according to the access failure notification. For example, prompt content of the access failure prompt may be "The access locations of the cloud gaming 2 are full". The access quantity threshold refers to an upper limit of a quantity of clients that are allowed to access the cloud gaming instance of the cloud gaming 2. If the quantity of clients that have accessed the cloud gaming instance of the cloud gaming 2 does not exceed the access quantity threshold, the audience client is allowed to access the cloud gaming instance. After the audience client successfully accesses the cloud gaming instance, the cloud gaming server may create a second stream processing resource of the cloud gaming instance, and bind the audience client to the second stream processing resource. Data transmission may be performed between the cloud gaming instance and the audience client based on the second stream processing resource.

Before the audience client accesses the cloud gaming instance, the host client has an operation permission for the cloud gaming instance, that is, the host client can operate the cloud gaming instance. After the audience client successfully accesses the cloud gaming instance, the cloud gaming server may configure a permission for the audience client according to a permission setting request of the host client. The permission may include at least one of the following: an operation permission for the cloud gaming instance or a browsing permission for the cloud gaming instance. The operation permission for the cloud gaming instance refers to a permission to operate the cloud gaming instance. The browsing permission for the cloud gaming instance refers to a permission to browse the game picture of the cloud gaming instance. A user with a browsing permission for the cloud gaming instance can only browse a game picture of another user operating the cloud gaming instance, and cannot operate the cloud gaming instance. In an implementation, if the cloud gaming server configures the operation permission of the cloud gaming instance for the audience client according to the permission setting request of the host client, in this case, the operation data of the audience client is injected into the cloud gaming instance, and the audience client may operate the cloud gaming instance. The host client may browse the game picture of the cloud gaming instance controlled by the audience client, and output a control prompt 813 (for example, "the audience client is controlling" shown in FIG. 8B) in the game interface 81. In another implementation, if the cloud gaming server configures the browsing permission of the cloud gaming instance for the audience client according to the permission setting request of the host client, in this case, the operation data of the audience client is discarded in a process of transmitting to the cloud gaming instance, the audience client cannot operate the cloud gaming instance, but can only browse the game picture of the cloud gaming instance controlled by the host client.

(2) A Plurality of Arcade Game Users Operate Cloud Gaming

In a game scenario in which a plurality of Arcade game users operate cloud gaming, a process in which the first client triggers creation of the cloud gaming instance and a process in which the second client accesses the cloud gaming instance are similar to those in the game scenario in which the host user teaches cloud gaming, and details are not described herein again. A difference between the game scenario in which a plurality of Arcade game users operate cloud gaming and the game scenario in which the host user teaches cloud gaming is as follows: In the game scenario in which the host user teaches cloud gaming, the permission of the second client for the cloud gaming instance is configured by the cloud gaming server according to the permission setting request of the first client. In the host client and audience client, only one client has the operation permission of the cloud gaming instance, and the other client has the browsing permission of the cloud gaming instance. In the game scenario in which a plurality of Arcade game users operate cloud gaming, all clients accessing the cloud gaming instance have the operation permission of the cloud gaming, and can operate the cloud gaming instance. For example, in double-player combat cloud gaming, after a cloud gaming instance of the double-player combat cloud gaming is successfully created, the first client maps to a first operation control, and the first client selects a double-player mode on the game interface. Then, after the second client accesses the cloud gaming instance, the second client maps to a second operation control. The user of the first client may inject operation data of the first client into the first operation control, so as to control the first operation control to operate the first gladiator in the cloud gaming instance according to the inputted operation data. The user of the second client may inject operation data of the second client into the second operation control, so as to control the second operation control to operate the second gladiator in the cloud gaming instance according to the inputted operation data, so as to implement two-player combat.

It may be learned from the foregoing game scenario in which the host user teaches cloud gaming, that the host client may transmit a permission setting request to the cloud gaming server, so as to implement switching and transfer of the operation permission between the host client and the audience client, and meet a game requirement of the host user during teaching. It may be learned from the foregoing game scenario in which a plurality of Arcade game users operate cloud gaming, that a plurality of clients accessing the cloud gaming instance have the operation permission for the cloud gaming instance, and all the clients can operate the cloud gaming instance to meet a game requirement of multi-user participation. The cloud gaming processing solution mentioned in this embodiment of this application can enrich a cloud gaming play scenario. In addition, each client participating in the cloud gaming has an independent one-stream processing resource, which can ensure that a data transmission process between the client and the cloud gaming instance is efficiently and smoothly performed, and a game picture displayed on each client is clear and smooth, thereby effectively improving game participation experience of the user.

The method in the embodiments of the present invention is described in detail above. For ease of better implementing the foregoing solutions in the embodiments of the present invention, an apparatus in an embodiment of the present invention is correspondingly provided in the following.

Figure 9:
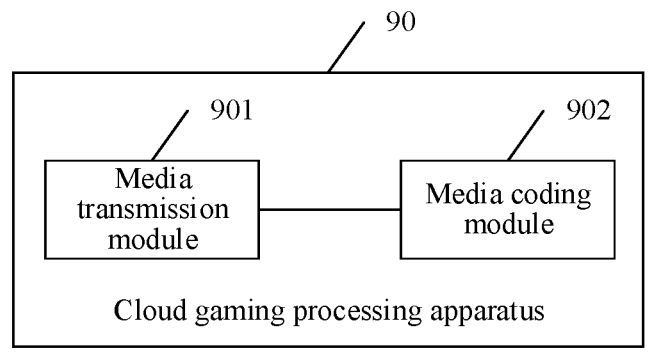
FIG. 9 is a schematic structural diagram of a cloud gaming processing apparatus according to an exemplary embodiment of this application.

Referring to FIG. 9, FIG. 9 is a schematic structural diagram of a cloud gaming processing apparatus according to an exemplary embodiment of this application. The cloud gaming processing apparatus 90 may be disposed in a cloud gaming processing device, and the cloud gaming processing device may be the server 304 in the cloud gaming processing system shown in FIG. 3. The cloud gaming processing apparatus 90 may be configured to perform corresponding steps in the method embodiment shown in FIG. 4 or FIG. 6, and the cloud gaming processing apparatus 90 may include the following units:

a media transmission module 901, configured to receive an access request of a second client for a cloud gaming instance, the cloud gaming instance having been created according to a play request of a first client for a cloud gaming and shared by the first client with the second client, the first client being bound to a first stream processing resource of the cloud gaming instance, and data transmission between the cloud gaming instance and the first client being implemented by using the first stream processing resource;

a media coding module 902 and the media transmission module 901, configured to create a second stream processing resource of the cloud gaming instance in response to the access request of the second client; and the media transmission module 901 is further configured to bind the second stream processing resource to the second client; and implement data transmission between the second client and the cloud gaming instance by using the second stream processing resource.

In an implementation, the access request of the second client carries a user identifier of the second client and a first access policy, and the first access policy is used for indicating that a type of the second client is a user type; and both the media coding module 902 and the media transmission module 901 are configured to: create a second stream processing resource of the cloud gaming instance in response to the access request of the second client, and specifically perform the following steps:

allocating an access session identifier to the second client according to the user identifier of the second client; and generating the second stream processing resource of the cloud gaming instance and an identifier of the second stream processing resource according to the first access policy.

In an implementation, when configured to bind the second stream processing resource to the second client, the media transmission module 901 is specifically configured to perform the following step:

establishing a binding relationship between the access session identifier of the second client and the identifier of the second stream processing resource, so as to implement binding of the second stream processing resource to the second client.

In an implementation, the media transmission module 901 is further configured to perform the following steps:

receiving an access request of a third client for the cloud gaming instance, the access request of the third client carrying a user identifier of the third client and a second access policy, and the second access policy being used for indicating that a type of the third client is an observer type;

selecting one stream processing resource from the first stream processing resource and the second stream processing resource in response to the access request of the third client;

binding the selected one stream processing resource to the third client; and performing data transmission between the third client and the cloud gaming instance based on the selected one stream processing resource.

In an implementation, when configured to perform data transmission between the second client and the cloud gaming instance based on the second stream processing resource, the media transmission module 901 is specifically configured to perform the following steps:

acquiring a media stream in the cloud gaming instance;

transmitting the media stream to the second client by using the second stream processing resource; and receiving, when the second client requests to operate the cloud gaming instance, operation data of the second client by using the second stream processing resource.

In an implementation, the media transmission module 901 is further configured to perform the following steps:

transmitting a network probe packet to the second client based on the second stream processing resource, and receiving network information returned by the second client; and adjusting a data volume of the network probe packet according to the network information, and adjusting a transmission parameter of the second stream processing resource.

In an implementation, when configured to adjust the data volume of the network probe packet according to the network information, and adjust the transmission parameter of the second stream processing resource, the media transmission module 901 is specifically configured to perform the following steps:

reducing the data volume of the network probe packet, and performing first adjustment on the transmission parameter of the second stream processing resource when the network information indicates that network congestion has occurred; and increasing the data volume of the network probe packet, and performing second adjustment on the transmission parameter of the second stream processing resource when the network information indicates that network congestion does not occur;

the first adjustment includes at least one of the following: reducing a media code rate in the second stream processing resource, reducing a frame rate of a media frame in the second stream processing resource, or discarding some media frames in the second stream processing resource; and the second adjustment includes at least one of the following: increasing a media code rate in the second stream processing resource or increasing a frame rate of a media frame in the second stream processing resource.

In an implementation, the media transmission module 901 is further configured to perform the following steps: configuring a permission for the second client according to a permission setting request of the first client, the permission including at least one of the following: an operation permission for the cloud gaming instance or a browsing permission for the cloud gaming instance.

The media coding module 902 is further configured to perform the following step: discarding, when the second client does not have the operation permission for the cloud gaming instance, operation data of the second client when the operation data of the second client is received by using the second stream processing resource.

In an implementation, the first client is mapped to a first operation control in the cloud gaming instance, and the second client is mapped to a second operation control in the cloud gaming instance; and when the media transmission module 901 receives the operation data of the first client based on the first stream processing resource, the media coding module 902 is further configured to perform the following steps: injecting the operation data of the first client into the first operation control, so as to control the first operation control to operate the cloud gaming instance; and when the media transmission module 901 receives the operation data of the second client based on the second stream processing resource, the media coding module 902 is further configured to perform the following step: injecting the operation data of the second client into the second operation control, so as to control the second operation control to operate the cloud gaming instance.

In an implementation, the media transmission module 901 is further configured to perform the following step: receiving, by using the first stream processing resource, a device resolution transmitted by the first client.

The media coding module 902 is further configured to perform the following step: setting a docker window resolution of the cloud gaming instance according to the device resolution.

The media transmission module 901 is further configured to perform the following step: transmitting the docker window resolution to the first client by using the first stream processing resource.

In an implementation, the media transmission module 901 is further configured to perform the following steps: transmitting the docker window resolution to the second client by using the second stream processing resource after the second client accesses the cloud gaming instance;

receiving, by using the second stream processing resource, a resolution setting request transmitted by the second client, the resolution setting request carrying a coding resolution that is requested to be set by the second client; and correcting, according to the docker window resolution, the coding resolution that is requested to be set.

The media coding module 902 is further configured to perform the following step: performing, by using the corrected coding resolution, coding processing on a media stream transmitted.

In an implementation, the media transmission module 901 is further configured to perform the following steps: receiving a sharing request of the first client for the cloud gaming instance; and returning a sharing password of the cloud gaming instance to the first client in response to the sharing request of the first client, so that the first client shares the sharing password to another client other than the first client; the sharing password includes an identifier of the cloud gaming instance and a login password of the cloud gaming instance; and transmitting of the access request of the second client is triggered by using the sharing password after the second client obtains the sharing password.

According to another embodiment of this application, units of the system for cloud gaming processing apparatus 90 shown in FIG. 9 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the cloud gaming processing apparatus 90 may also include other units. In an actual application, the functions may also be cooperatively implemented by other units and may be cooperatively implemented by a plurality of units. According to another embodiment of this application, a computer program (including program code) that can perform the steps in the corresponding method shown in FIG. 4 or FIG. 6 may be run on a general computing device, such as a computer, which includes processing elements and storage elements such as a central processing unit (CPU), a random access memory (RAM), and a read-only memory (ROM), to construct the cloud gaming processing apparatus 90 shown in FIG. 9 and implement the cloud gaming processing method in the embodiments of this application. The computer program may be recorded in, for example, a computer-readable storage medium, and may be loaded into the foregoing computing device by using the computer-readable storage medium, and run in the computing device.

In this embodiment of this application, when a first client initiates a play request for cloud gaming and creates a cloud gaming instance, a first stream processing resource of the cloud gaming instance is allocated to the first client, and the first client is bound to the first stream processing resource. The first client performs data transmission with the cloud gaming instance based on the first stream processing resource. A second client may request to access the cloud gaming instance created by the first client. In response to the access request of the second client, a second stream processing resource of the cloud gaming instance is allocated to the second client, and the second stream processing resource is bound to the second client. Data transmission between the second client and the cloud gaming instance may be implemented based on the second stream processing resource. It can be learned that the embodiments of this application support a plurality of operations on the same cloud gaming instance, that is, allow a plurality of clients (for example, the first client and the second client) to access and operate the same cloud gaming instance, thereby effectively improving flexibility and diversity of a cloud gaming operation mode. In addition, each client connected to the same cloud gaming instance is bound to a separate stream processing resource of the cloud gaming instance, and performs data transmission based on the separate stream processing resource bound to the client. In this way, targeted and independent coding traffic control and quality control can be performed on each client based on each stream processing resource, and because stream processing resources are independent of each other and do not affect each other, data transmission can be performed efficiently and stably between the client and the cloud gaming instance.

Figure 10:
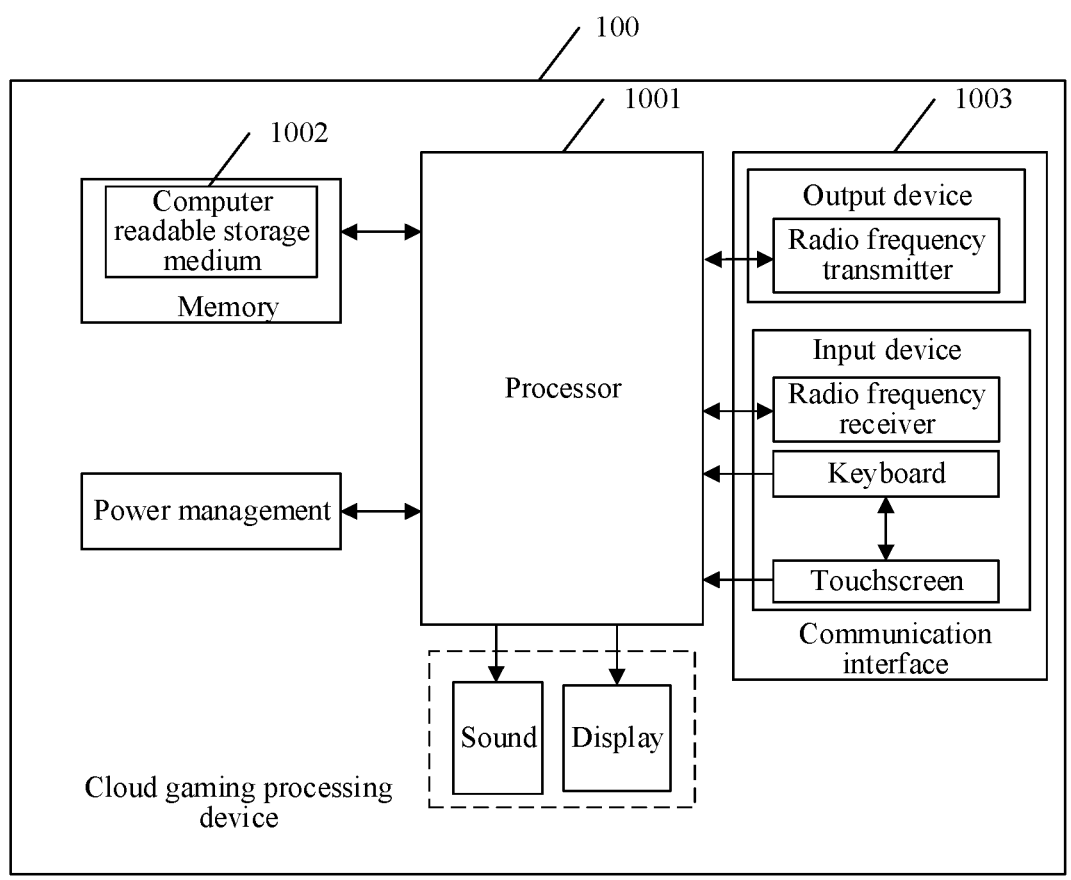
FIG. 10 is a schematic structural diagram of a cloud gaming processing device according to an exemplary embodiment of this application.

Referring to FIG. 10, FIG. 10 is a schematic structural diagram of a cloud gaming processing device according to an exemplary embodiment of this application. The cloud gaming processing device 100 includes at least a processor 1001, a computer readable storage medium 1002, and a communication interface 1003. The processor 1001, the computer readable storage medium 1002, and the communication interface 1003 may be connected by using a bus or in another manner. The communication interface 1003 may be configured to receive a play request of a first client, an access request of a second client, operation data of the first client, operation data of the second client, and the like. The communication interface 1003 may further transmit a media stream to the first client, transmit a media stream to the second client, and the like. The computer readable storage medium 1002 may be stored in a memory, the computer readable storage medium 1002 is configured to store a computer program, and the computer program includes a computer instruction. The processor 1001 is configured to execute the computer instruction. The processor 1001 (or referred to as a central processing unit (CPU)) is a computing core and a control core of the cloud gaming processing device 100, is suitable for implementing one or more computer instructions, and is specifically suitable for loading and executing one or more computer instructions to implement a corresponding method procedure or a corresponding function.

An embodiment of this application further provides a computer storage medium. The computer-readable storage medium is a memory device in a cloud gaming processing device 100 and is configured to store programs and data. It may be understood that the computer-readable storage medium 1002 herein may include an internal storage medium of the cloud gaming processing device 100 and certainly may also include an extended storage medium supported by the cloud gaming processing device 100. The computer-readable storage medium provides storage space, and the storage space stores an operating system of the cloud gaming processing device 100. In addition, the storage space further stores one or more computer instructions suitable for being loaded and executed by the processor 1001. The computer instructions may be one or more computer programs (including program code). The computer-readable storage medium 1002 herein may be a high-speed RAM, or may be a non-volatile memory, such as at least one magnetic disk storage. In some embodiments, the computer storage medium may be at least one computer-readable storage medium far away from the foregoing processor 1001.

The cloud gaming processing device 100 may be the server 304 in the cloud gaming processing system shown in FIG. 3. The computer readable storage medium 1002 stores a computer program, and the computer program includes one or more computer instructions. The processor 1001 loads and executes the one or more computer instructions to implement corresponding steps in the method embodiment shown in FIG. 4 or FIG. 6. In specific implementation, the computer instruction in the computer readable storage medium 1002 is loaded by the processor 1001 to perform the cloud gaming processing method provided in the foregoing exemplary manners.

In this embodiment of this application, when a first client initiates a play request for cloud gaming and creates a cloud gaming instance, a first stream processing resource of the cloud gaming instance is allocated to the first client, and the first client is bound to the first stream processing resource. The first client performs data transmission with the cloud gaming instance based on the first stream processing resource. A second client may request to access the cloud gaming instance created by the first client. In response to the access request of the second client, a second stream processing resource of the cloud gaming instance is allocated to the second client, and the second stream processing resource is bound to the second client. Data transmission between the second client and the cloud gaming instance may be implemented based on the second stream processing resource. It can be learned that the embodiments of this application support a plurality of operations on the same cloud gaming instance, that is, allow a plurality of clients (for example, the first client and the second client) to access and operate the same cloud gaming instance, thereby effectively improving flexibility and diversity of a cloud gaming operation mode. In addition, each client connected to the same cloud gaming instance is bound to a separate stream processing resource of the cloud gaming instance, and performs data transmission based on the separate stream processing resource bound to the client. In this way, targeted and independent coding traffic control and quality control can be performed on each client based on each stream processing resource, and because stream processing resources are independent of each other and do not affect each other, data transmission can be performed efficiently and stably between the client and the cloud gaming instance.

In addition, an embodiment of this application further provides a storage medium. The storage medium is configured to store a computer program. The computer program is configured to perform the methods provided in the foregoing embodiments.

An aspect of the embodiments of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the cloud gaming processing method provided in the various exemplary implementations.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A cloud gaming processing method performed by a computer device and the method comprising:
   receiving a request for playing a cloud gaming from a first client at a first terminal, the play request including a user identifier of the first client and indicating that the first client is a primary player of the cloud computing;
   creating a cloud gaming instance in response to the request for playing the cloud gaming from the first client;
   binding the first client to a first stream processing resource of the cloud gaming instance, wherein data transmission between the cloud gaming instance and the first client is implemented by using the first stream processing resource;
   receiving an access request for the cloud gaming instance from a second client at a second terminal, the access request including a user identifier of the second client and a first access policy indicating that the second client is a participant of the cloud gaming instance;
   creating a second stream processing resource of the cloud gaming instance in response to the access request of the second client;
   binding the second stream processing resource to the second client;
   implementing data transmission between the second client and the cloud gaming instance by using the second stream processing resource;
   transmitting a network probe packet to the second client using the second stream processing resource for detecting a network congestion situation of the second stream processing resource;
   receiving network information returned by the second client in response to the network probe packet; and
   adjusting one or more network transmission parameters of the second stream processing resource in accordance with the network information and the first access policy,
   wherein the first stream processing resource and the second stream processing resource have different video streams of the cloud gaming instance and share one audio stream of the cloud gaming instance.

2. The method according to claim 1, wherein the access request of the second client is initiated by the second client after receiving the play request shared by the first client.

3. The method according to claim 1, wherein each of the first stream processing resource and the second stream processing resource has a dedicated transmission control resource for performing predefined coding traffic control and quality control on each corresponding client separately.

4. The method according to claim 1, wherein the method further comprises:
   receiving an access request of a third client at a third terminal for the cloud gaming instance, the access request of the third client carrying a user identifier of the third client and a second access policy indicating that the third client is an observer of the cloud gaming instance;
   selecting one stream processing resource from the first stream processing resource and the second stream processing resource in response to the access request of the third client and according to the second access policy;
   binding the selected one stream processing resource to the third client; and
   performing data transmission between the third client and the cloud gaming instance based on the selected one stream processing resource.

5. The method according to claim 1, wherein the implementing data transmission between the second client and the cloud gaming instance by using the second stream processing resource comprises:
   acquiring a media stream from the cloud gaming instance;
   transmitting the media stream to the second client by using the second stream processing resource; and
   when the second client requests to operate the cloud gaming instance, receiving operation data of the second client by using the second stream processing resource.

6. The method according to claim 1, wherein the method further comprises:
   configuring a permission for the second client according to a permission setting request of the first client, the permission comprising at least one of the following: an operation permission for the cloud gaming instance or a browsing permission for the cloud gaming instance; and
   when the second client does not have the operation permission for the cloud gaming instance, discarding operation data of the second client when the operation data of the second client is received by using the second stream processing resource.

7. The method according to claim 1, wherein the first client is mapped to a first operation control in the cloud gaming instance, and the second client is mapped to a second operation control in the cloud gaming instance; and the method further comprises:
   when operation data of the first client is received based on the first stream processing resource, injecting the operation data of the first client into the first operation control, so as to control the first operation control to operate the cloud gaming instance; and
   when operation data of the second client is received based on the second stream processing resource, injecting the operation data of the second client into the second operation control, so as to control the second operation control to operate the cloud gaming instance.

8. The method according to claim 1, wherein the method further comprises:
   receiving, by using the first stream processing resource, a device resolution transmitted by the first client;
   setting a docker window resolution of the cloud gaming instance according to the device resolution;
   transmitting the docker window resolution to the first client by using the first stream processing resource;
   receiving, by using the second stream processing resource, a resolution setting request transmitted by the second client, the resolution setting request carrying a coding resolution that is requested to be set by the second client; and
   performing, by using the second stream processing resource, coding processing on a media stream transmitted to the second client based on coding resolution.

9. A computer device, comprising:
   a processor; and
   a non-transitory computer-readable storage medium, storing a computer program, and the computer program being adapted to be loaded and executed by the processor and causing the computer device to implement a cloud gaming processing method and the method comprising:
   receiving a request for playing a cloud gaming from a first client at a first terminal, the play request including a user identifier of the first client and indicating that the first client is a primary player of the cloud computing;
   creating a cloud gaming instance in response to the request for playing the cloud gaming from the first client;
   binding the first client to a first stream processing resource of the cloud gaming instance, wherein data transmission between the cloud gaming instance and the first client is implemented by using the first stream processing resource;
   receiving an access request for the cloud gaming instance from a second client at a second terminal, the access request including a user identifier of the second client and a first access policy indicating that the second client is a participant of the cloud gaming instance;
   creating a second stream processing resource of the cloud gaming instance in response to the access request of the second client;
   binding the second stream processing resource to the second client;
   implementing data transmission between the second client and the cloud gaming instance by using the second stream processing resource;
   transmitting a network probe packet to the second client using the second stream processing resource for detecting a network congestion situation of the second stream processing resource;
   receiving network information returned by the second client in response to the network probe packet; and
   adjusting one or more network transmission parameters of the second stream processing resource in accordance with the network information and the first access policy,
   wherein the first stream processing resource and the second stream processing resource have different video streams of the cloud gaming instance and share one audio stream of the cloud gaming instance.

10. The computer device according to claim 9, wherein the access request of the second client is initiated by the second client after receiving the play request shared by the first client.

11. The computer device according to claim 9, wherein each of the first stream processing resource and the second stream processing resource has a dedicated transmission control resource for performing predefined coding traffic control and quality control on each corresponding client separately.

12. The computer device according to claim 9, wherein the method further comprises:
   receiving an access request of a third client at a third terminal for the cloud gaming instance, the access request of the third client carrying a user identifier of the third client and a second access policy indicating that the third client is an observer of the cloud gaming instance;
   selecting one stream processing resource from the first stream processing resource and the second stream processing resource in response to the access request of the third client and according to the second access policy;
   binding the selected one stream processing resource to the third client; and
   performing data transmission between the third client and the cloud gaming instance based on the selected one stream processing resource.

13. The computer device according to claim 9, wherein the implementing data transmission between the second client and the cloud gaming instance by using the second stream processing resource comprises:
   acquiring a media stream from the cloud gaming instance;
   transmitting the media stream to the second client by using the second stream processing resource; and
   when the second client requests to operate the cloud gaming instance, receiving operation data of the second client by using the second stream processing resource.

14. The computer device according to claim 9, wherein the method further comprises:
   configuring a permission for the second client according to a permission setting request of the first client, the permission comprising at least one of the following: an operation permission for the cloud gaming instance or a browsing permission for the cloud gaming instance; and
   when the second client does not have the operation permission for the cloud gaming instance, discarding operation data of the second client when the operation data of the second client is received by using the second stream processing resource.

15. The computer device according to claim 9, wherein the method further comprises:
   receiving, by using the first stream processing resource, a device resolution transmitted by the first client;
   setting a docker window resolution of the cloud gaming instance according to the device resolution; and
   transmitting the docker window resolution to the first client by using the first stream processing resource.

16. A non-transitory computer-readable storage medium, the computer-readable storage medium comprising a computer program, and the computer program being adapted to be loaded and executed by a processor of a computer device and causing the computer device to implement a cloud gaming processing method and the method comprising:
   receiving a request for playing a cloud gaming from a first client at a first terminal, the play request including a user identifier of the first client and indicating that the first client is a primary player of the cloud computing;

creating a cloud gaming instance in response to the request for playing the cloud gaming from the first client;

binding the first client to a first stream processing resource of the cloud gaming instance, wherein data transmission between the cloud gaming instance and the first client is implemented by using the first stream processing resource;

receiving an access request for the cloud gaming instance from a second client at a second terminal, the access request including a user identifier of the second client and a first access policy indicating that the second client is a participant of the cloud gaming instance;

creating a second stream processing resource of the cloud gaming instance in response to the access request of the second client;

binding the second stream processing resource to the second client;

implementing data transmission between the second client and the cloud gaming instance by using the second stream processing resource;

transmitting a network probe packet to the second client using the second stream processing resource for detecting a network congestion situation of the second stream processing resource;

receiving network information returned by the second client in response to the network probe packet; and adjusting one or more network transmission parameters of the second stream processing resource in accordance with the network information and the first access policy, wherein the first stream processing resource and the second stream processing resource have different video streams of the cloud gaming instance and share one audio stream of the cloud gaming instance.

17. The non-transitory computer-readable storage medium according to claim 16, wherein each of the first stream processing resource and the second stream processing resource has a dedicated transmission control resource for performing predefined coding traffic control and quality control on each corresponding client separately.

18. The non-transitory computer-readable storage medium according to claim 16, wherein the access request of the second client is initiated by the second client after receiving the play request shared by the first client.

19. The non-transitory computer-readable storage medium according to claim 16, wherein the method further comprises:

receiving an access request of a third client at a third terminal for the cloud gaming instance, the access request of the third client carrying a user identifier of the third client and a second access policy indicating that the third client is an observer of the cloud gaming instance;

selecting one stream processing resource from the first stream processing resource and the second stream processing resource in response to the access request of the third client and according to the second access policy;

binding the selected one stream processing resource to the third client; and performing data transmission between the third client and the cloud gaming instance based on the selected one stream processing resource.

20. The non-transitory computer-readable storage medium according to claim 16, wherein the method further comprises:

configuring a permission for the second client according to a permission setting request of the first client, the permission comprising at least one of the following: an operation permission for the cloud gaming instance or a browsing permission for the cloud gaming instance; and when the second client does not have the operation permission for the cloud gaming instance, discarding operation data of the second client when the operation data of the second client is received by using the second stream processing resource.

* * * * *